(12) United States Patent
Takano et al.

(10) Patent No.: US 7,406,987 B2
(45) Date of Patent: Aug. 5, 2008

(54) APPARATUS AND METHOD FOR FILLING FUEL

(75) Inventors: Naoyuki Takano, Tokyo (JP); Kazutoshi Sato, Tokyo (JP); Kanji Omori, Tokyo (JP)

(73) Assignee: Taiyo Nippon Sanso Corporation, Tokyo (JP)

( * ) Notice: Subject to any disclaimer, the term of this patent is extended or adjusted under 35 U.S.C. 154(b) by 179 days.

(21) Appl. No.: 10/529,130

(22) PCT Filed: Sep. 24, 2003

(86) PCT No.: PCT/IB03/04131

§ 371 (c)(1),
(2), (4) Date: Mar. 22, 2005

(87) PCT Pub. No.: WO2004/033955

PCT Pub. Date: Apr. 22, 2004

(65) Prior Publication Data

US 2006/0016512 A1 Jan. 26, 2006

(30) Foreign Application Priority Data

Sep. 25, 2002 (JP) ............................. 2002-279230
Oct. 3, 2002 (JP) ............................. 2002-291341
Oct. 8, 2002 (JP) ............................. 2002-295151

(51) Int. Cl.
*B65B 1/04* (2006.01)
(52) U.S. Cl. ..................... 141/82; 222/146.6
(58) Field of Classification Search ............... 141/82, 141/67, 98, 2, 18; 62/50.1–50.6; 222/146.1, 222/146.6

See application file for complete search history.

(56) References Cited

U.S. PATENT DOCUMENTS

| 5,505,232 | A  | * | 4/1996  | Barclay ..................... 141/11 |
| 5,520,000 | A  | * | 5/1996  | Pevzner ..................... 62/48.1 |
| 5,934,081 | A  | * | 8/1999  | Notaro et al. ............... 62/50.2 |
| 6,810,924 | B2 | * | 11/2004 | White ........................ 141/82 |
| 6,810,925 | B2 | * | 11/2004 | Graham et al. .............. 141/98 |
| 7,124,790 | B2 | * | 10/2006 | Bushko ....................... 141/82 |
| 7,128,103 | B2 | * | 10/2006 | Mitlitsky et al. ............ 141/248 |

OTHER PUBLICATIONS

"Technical Guideline of Standard and safety for Compressed Nature Gas" Incorporated juridical body of Japanese Gas Association, Apr. 1998 / pp. 11.
"High Pressure Regulators" IPROS Co. Ltd. / Jun. 2, 1996.

* cited by examiner

*Primary Examiner*—Steven O Douglas
(74) *Attorney, Agent, or Firm*—J.C. Patents

(57) ABSTRACT

A fuel filling apparatus is provided. The fuel filling apparatus comprises an overfilling protective valve arranged in a fuel gas supply path for supplying a fuel gas to an automobile. The overfilling protective valve further comprises a fuel gas path, a valve unit for opening and closing the fuel gas path by a valve body, a valve body displacement means for displacing the valve body according to a filling pressure of the fuel gas, and a temperature modulating unit for modulating a temperature of the valve body displacement means. Even though a difference between the temperature of the fuel gas and the operation temperature of the overfilling protective valve is large, the temperature of the valve body displacement means can be maintained within the preset temperature range by the temperature modulating unit and the overfilling protective valve can be exactly operated under the preset pressure.

3 Claims, 13 Drawing Sheets

APPARATUS AND METHOD FOR FILLING FUEL

BACKGROUND OF THE INVENTION

1. Field of the Invention

This invention relates in general to an apparatus and a method for filling fuel. Hydrogen gas or compressed nature gas is filled as a fuel gas into an automobile.

2. Description of the Related Art

As a next generation automobile, compressed nature gas automobiles using compressed nature gas as the fuel gas and hydrogen gas automobiles using hydrogen gas as the fuel gas are developed. These automobiles are characterized in that discharge amount of carbon dioxide gas, nitrogen oxide (NOx), and oxysulfide (SOx), etc. is very little.

For refueling, these automobiles are the same as the gasoline automobile. These automobiles arrive at a supply base having a fuel filling apparatus (dispenser) for filling their fuel, i.e., the compressed nature gas or the hydrogen gas, and the compressed nature gas or the hydrogen gas are supplied from the fuel filling apparatus (for example, referring to non-patent document 1). In addition, the compressed nature gas and the hydrogen gas are generally referred to a fuel gas.

The conventional fuel Filling apparatus for the automobile, for example, comprises a fuel gas supplying path, a flow modulating valve, an integrating flowmeter, a shut-off valve, and an overfilling protective valve. The fuel gas supplying path is connected to a pressure accumulator that is used as a source for supplying a high-pressure fuel gas. The flow modulating valve modulates a supply amount of the fuel gas provided from the pressure accumulator. The integrating flowmeter is used to measure and integrate the flow of the fuel gas. The shut-off valve stops supplying the fuel gas when filling of the fuel gas is completed. The overfilling protective valve will shut off the supply path when the pressure of the fuel gas exceeds a preset pressure.

FIG. 14 is a schematic cross-sectional view illustrating an example of a conventional overfilling protective valve. The overfilling protective valve 120 includes a fuel gas path 121, a valve unit for opening and closing the fuel gas path 121 by a valve body 130, and a valve displacement means 123 for displacing the valve 130 based on a filling pressure of the fuel gas, referring to non-patent document 2.

In addition, the valve displacement means 123, in the conventional example, is a spring, and thus the following description is made by referring to the spring 123.

The fuel gas path 121 is connected to a fuel gas supply path 3. The valve unit 122 includes a valve rod 131 having the valve body and a valve box 131 with a sliding hole 132 where the valve rod 131 is slidably received therein. The sliding hole 132 is connected to the fuel gas path 121. The valve body 130 is formed at a location that is equivalent to a valve chest 134 formed in the sliding hole 132.

The spring 123 is received in a spring receiving unit 140, and the spring 123 obtains a repulsive force from the interior of the spring receiving 140 to provide a resilient force in the direction of the valve unit 122 to a piston 142 through a ball 141.

The piston 142 is received in a piston receiving unit 143.

The piston 142 is fixed on one end of the valve rod 131, so that the piston 142 and the valve rod move together. A branch path 144, which branches from the fuel gas supply path 3 at the secondary side of the overfilling protective valve 120, is connected to the piston receiving unit 143. The fuel gas within the fuel gas supply path 3 at the secondary side passes through the branch path 144, and then is supplied to between the valve unit 122 and the piston 142 in the piston receiving unit 143.

The overfilling protective valve 120 operates in the following manner.

When the pressure of the fuel gas flowing from the fuel gas supply path 3 at the secondary side to the lower side of the piston 142 in the piston receiving unit 143, i.e., the gas pressure at the secondary side, is lower than the preset pressure, the valve rod 131 moves downwards with respect to FIG. 4 due to the resilient force generated by the spring 123, and therefore, a gap is created between the valve body 130 and the inner wall of the fuel gas path 121. In this manner, the fuel gas path 121 is open, and then the fuel gas flows from the fuel gas supply path 3 at the primary side to the fuel gas supply path 3 at the secondary side.

As the gas pressure at the secondary side becomes the preset pressure, the piston 142 is moved by the gas pressure to press and compress the spring 123. Then, the fuel gas path 121 is closed by that the valve body 130 is in contact with the inner wall of the fuel gas path 121. In this manner, the fuel gas is stopped flowing from the fuel gas supply path 3 at the primary side to the fuel gas supply path 3 at the secondary side.

As described above, the overfilling protective valve 120 is constructed to switch the fuel gas path 121 on or off according to a balance between the gas pressure at the secondary side and the resilient force of the spring 123. In other words, the preset pressure for that the overfilling protective valve 120 is switched on or off is determined by the resilient force of the spring 123.

A fuel filling apparatus for the compressed nature gas is disclosed in the non-patent document 1. That document disclosed a fuel filling apparatus (a dispenser unit) having an overfilling protective device that is a valve for modulating a supply amount of nature gas.

Non-patent document 1: "TECHNICAL GUIDELINE OF STANDARD AND SAFETY FOR COMPRESSED NATURE GAS", incorporated juridical body Japanese Gas Association, pp. 11, April.

Non-patent document 2: "HIGH PRESSURE REGULATOR", IPROS Co. Ltd., Jun. 2, 1996.

However, the ordinary gas possesses a property that the gas temperature varies due to the Joule Thomson effect when the gas passes through a thin path, such as a valve. Specifically, similar to the other high pressure gas (such as inert gas, oxygen gas, etc.), the temperature of the compressed nature gas decreases obviously when the compressed nature gas expands adiabatically from its compressed status (for example, under a pressure of 20 MPa). In addition, the hydrogen gas, which is different from the ordinary gas, possesses property that the gas temperature rises due to the Joule Thomson effect. Therefore, the temperature of the hydrogen gas rises when the hydrogen gas passes through a valve, etc.

When the overfilling protective valve 120 is heated or cooled by the fuel gas that passes through the overfilling protective valve 120, the spring 123 is thus heated or cooled, so that the elastic coefficient of the spring changes. As a result, there will be a problem that the overfilling protective valve 120 fails to operate by the correct set pressure.

As a fuel tank for the automobile, a container made of Fiber Reinforced Polymer (FRP) for light weight is used. An upper limit of the temperature for using the FRP container is restricted in consideration its durability, and the upper limit is generally about 85° C.

As described above, similar to the other high pressure gas (such as inert gas, oxygen gas, etc.), the temperature of the compressed nature gas decreases due to the Joule Thomson effect when the compressed nature gas expands adiabatically from its compressed status (for example, under a pressure of 35 MPa). In consequence, the temperature of the compressed nature gas reduces when the compressed nature gas passes through a machine with thin holes or slits, such as a mechanical valve, a check valve, or a coupler.

Therefore, when the nature gas is filled into the fuel tank, since the gas temperature is very difficult to rise, the gas can be easily filled within a short time without managing the tank temperature.

On the other hand, the hydrogen gas, which is different from the ordinary gas, possesses a property that the gas temperature will rise due to the Joule Thomson effect. Therefore, the temperature of the hydrogen gas rises when the hydrogen gas passes through a machine, for example, a valve. Furthermore, when filling the hydrogen gas into the fuel tank, the temperature also rises due to the adiabatic compression, and therefore, the gas temperature rises easily to a very high value. Since the fuel tank made of FRP has an upper limit for the temperature, a serious temperature management is required during filling the hydrogen gas. Additionally, it is very difficult to increase the filling speed.

For the hydrogen gas automobile, for a purpose that the temperature of the fuel tank does not exceed a designed temperature, a method is disclosed to directly measure the temperature of the fuel tank while the gas is filled into the fuel tank.

More specifically, a method is provided that a temperature terminal (a temperature sensor) is set in the fuel tank of the automobile, wherein a fuel filling pipe is connected to the fuel tank of the automobile and wires for measuring the temperature are connected to the temperature terminal, so that the gas supply amount is modulated and the fuel is filled according to the detected tank temperature.

However, in the above method, it requires to connect an additional wire for measuring the temperature with the pipe for filling the fuel to the automobile, causing a problem of taking a lot of time in operation.

In addition, since a lower explosion concentration in the air is 4 vol % and the upper explosion concentration is 75 vol % for the hydrogen gas, it is very dangerous if the hydrogen gas leaks. Therefore, in general, parts used in the fuel filling apparatus for the hydrogen gas has to include a pressure-resistance and explosion-proof structure specified by JIS C 0931. Accordingly, it is quite expensive to make or maintain the management of the fuel filling apparatus for the hydrogen gas, so that there are problems of high price and large volume of the apparatus.

SUMMARY OF THE INVENTION

According to the foregoing description, an object of the present invention is to provide a fuel filling apparatus with an overfilling protective valve, in which the overfilling protective valve can operate exactly according to a set pressure when the hydrogen gas or the compressed nature gas is supplied to the automobile.

It is another object of the present invention to provide a fuel filling apparatus, in which the hydrogen gas can be safely and rapidly filled with a simpler structure.

It is still another object of the present invention to provide an apparatus and a method for filling fuel, wherein the temperature of a fuel tank of a hydrogen gas automobile, etc. that uses a fuel cell as a power source can be exactly controlled to a low value, and the fuel can be filled with a simple operation.

According to the at least objects mentioned above, the present invention provides a fuel filling apparatus, which comprises an overfilling protective valve arranged in a fuel gas supply path for supplying a fuel gas to an automobile. The overfilling protective valve further comprises a fuel gas path; a valve unit for opening and closing the fuel gas path by a valve body; a valve body displacement means for displacing the valve body according to a filling pressure of the fuel gas; and a temperature modulating unit for modulating a temperature of the valve body displacement means.

According to the above fuel filling apparatus, even though a difference between the temperature of the fuel gas and the operation temperature of the overfilling protective valve is large, the temperature of the valve body displacement means can be maintained within the preset temperature range by the temperature modulating unit. Therefore, the overfilling protective valve can be exactly operated under the preset pressure.

Since the operation temperature of the overfilling protective valve is generally determined as the room temperature, the temperature modulation of the valve body displacement means by using the temperature modulating unit is preferably made in a manner that the temperature of the valve body displacement means is maintained at about the room temperature.

In the above fuel filling apparatus, a heat exchanger can be arranged in the fuel gas supply path for cooling the fuel gas. In this manner, the fuel gas can be cooled almost without increasing the required energy for the temperature modulation of the temperature modulating unit.

In this case, the temperature modulating unit can use a refrigerant supplied to the heat exchanger to cool the valve body displacement means. In this manner, supplying the refrigerant to the temperature modulating unit can be easily implemented.

The present invention further provides a fuel filling apparatus for filling a hydrogen gas to a fuel tank of an automobile that uses the hydrogen gas as a fuel. The fuel filling apparatus comprises a heat exchanger for cooling the hydrogen gas.

In this manner, the temperature of the hydrogen gas can be prevented from rising rapidly and the hydrogen gas can be rapidly filled.

The present invention further provides a fuel filling apparatus for filling a hydrogen gas to a fuel tank of an automobile that uses the hydrogen gas as a fuel. The fuel filling apparatus comprises a heat exchanger using a liquid inert gas as a refrigerant to cool the hydrogen gas. The heat exchanger performs a heat exchange with the hydrogen gas to gasify the liquid inert gas to obtain an inert gas, and the obtained inert gas is discharged into the fuel filling apparatus.

The liquid inert gas can be liquid nitrogen or liquid argon, etc., for example.

In the above fuel filling apparatus, the heat exchanger can further comprise a first heat exchange unit for cooling the hydrogen gas by an intermediate medium, and a second heat exchange unit for cooling the intermediate medium by the liquid inert gas.

The present invention further provides a fuel filling apparatus for filling a hydrogen gas to a fuel tank of an automobile that uses the hydrogen gas as a fuel. The fuel filling apparatus can comprises a flow modulating valve for modulating a supply amount of a hydrogen gas; and a cooling means for cooling the hydrogen gas passing through the flow modulating valve.

The above fuel filling apparatus can further comprises a control means for controlling the supply amount of the hydrogen gas. The control means further comprises a memory unit for storing a temperature history data base; and a control unit for controlling the supply amount of the hydrogen gas by modulating an aperture of the flow modulating valve according to data stored in the temperature history data base. The temperature history data base comprises data showing a relationship among a temperature in the fuel tank before filling, a temperature of the hydrogen gas fill to the fuel tank, the aperture of the flow modulating valve, and a temperature in the fuel tank when filling the hydrogen gas.

The present invention also provides a fuel filling method for filling a hydrogen gas to a fuel tank of an automobile that uses the hydrogen gas as a fuel by using a fuel filling apparatus. The fuel filling apparatus comprises a flow modulating valve for modulating a supply amount of the hydrogen gas and a cooling means for cooling the hydrogen gas. The fuel filling method comprises steps of cooling the hydrogen gas passing through the flow modulating valve by using the cooling means; and filling the cooled hydrogen gas into the fuel tank.

The above fuel filling apparatus further comprises a control means for controlling the supply amount of the hydrogen gas. The control means further comprises a memory unit for storing a temperature history data base; and a control unit for controlling the supply amount of the hydrogen gas by modulating an aperture of the flow modulating valve according to data stored in the temperature history data base. The temperature history data base comprises data showing a relationship among a temperature in the fuel tank before filling, a temperature of the hydrogen gas fill to the fuel tank, the aperture of the flow modulating valve, and a temperature in the fuel tank when filling the hydrogen gas.

DESCRIPTION OF THE PREFERRED EMBODIMENT

The embodiment of the present invention is described in detail according to attached drawings.

In the following description, any one of or both of the hydrogen gas and the compressed nature gas are referred to the fuel gas, and the hydrogen gas automobile and the compressed nature gas automobile are referred to the automobile.

First Embodiment

Figure 1:
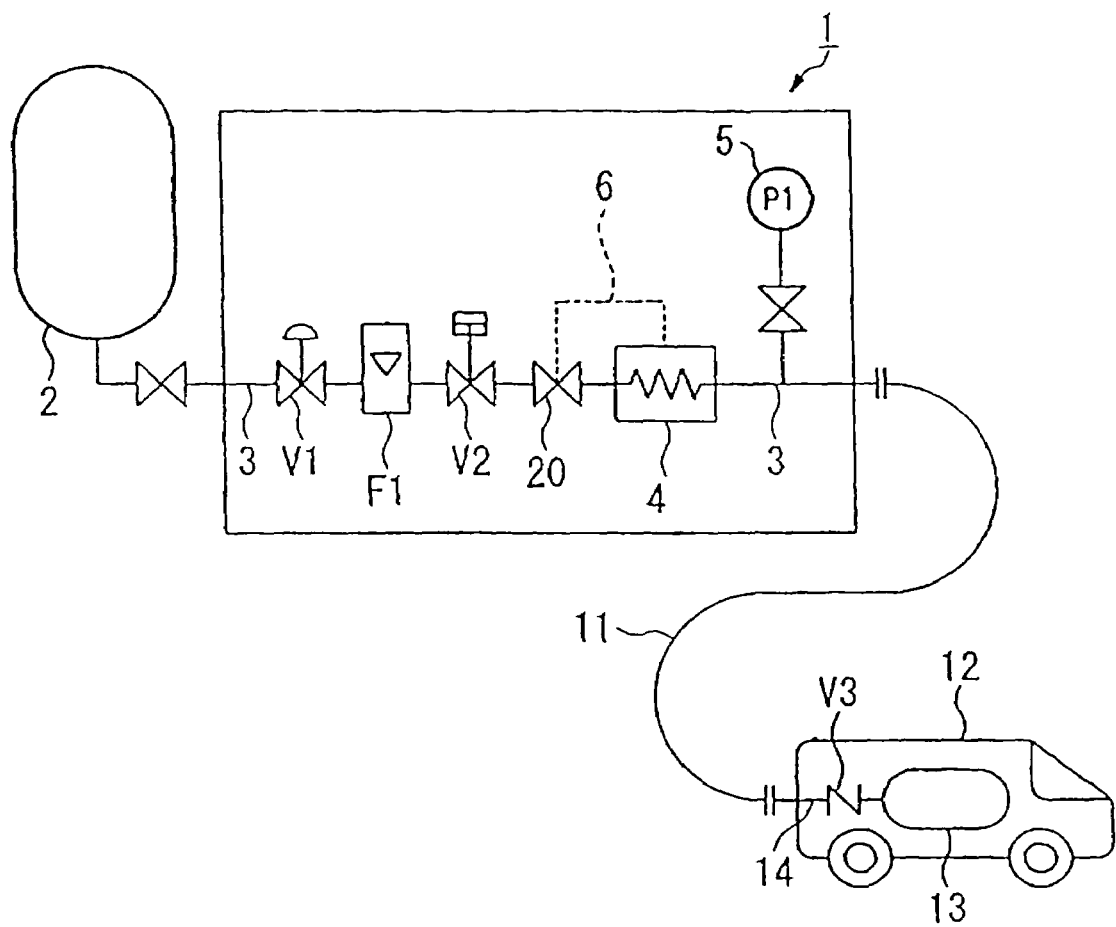
FIG. 1 schematically shows a structure of a fuel filling apparatus according to the first embodiment of the present invention.
Figure 2:
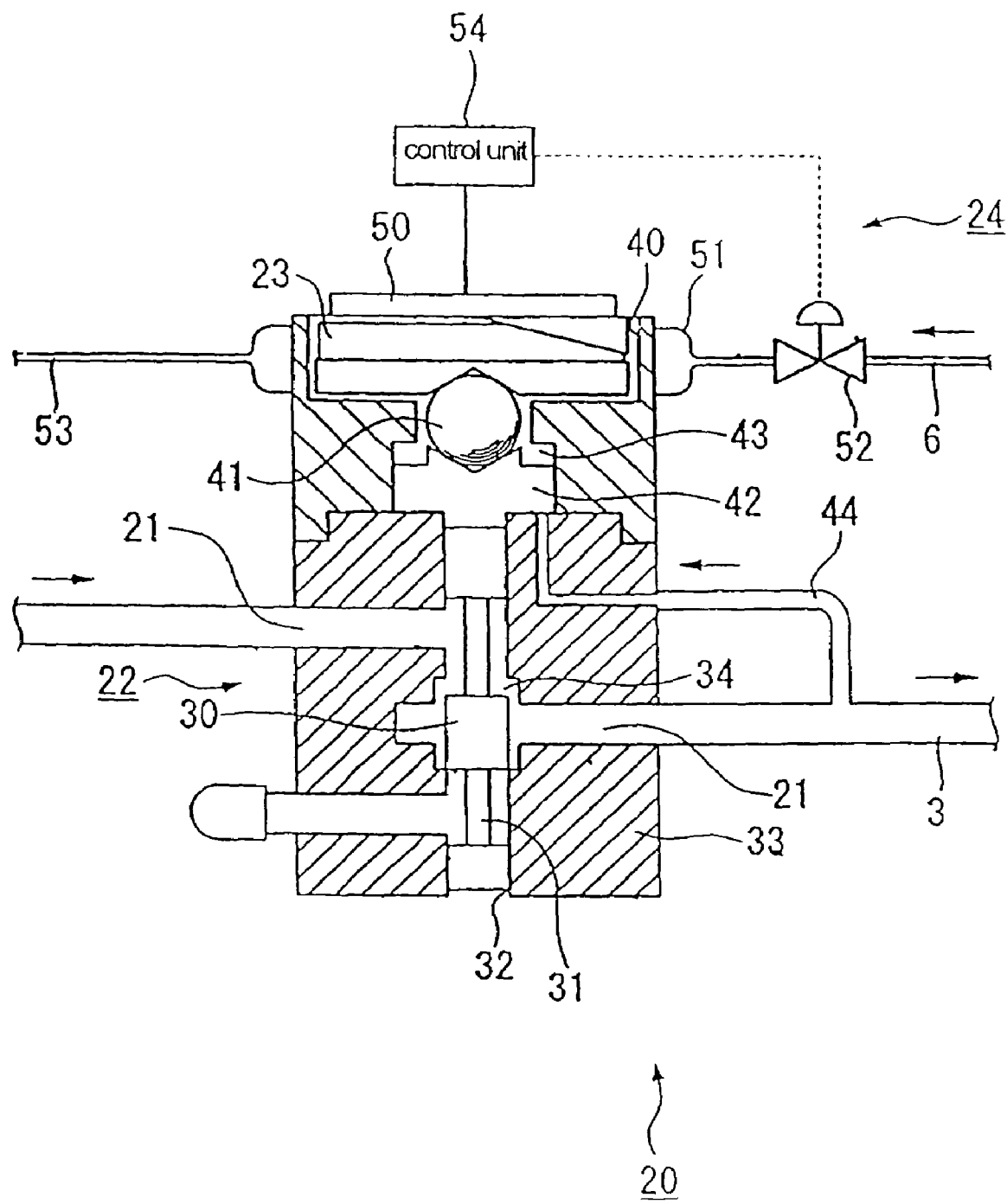
FIG. 2 is an exemplary overfilling protective valve suitable for the fuel filling apparatus according to the first embodiment of the present invention.

FIG. 1 schematically shows a structure of a fuel filling apparatus according to the first embodiment of the present invention. FIG. 2 is a cross-sectional view of an exemplary overfilling protective valve that is applicable to the fuel filling apparatus shown in FIG. 1.

As shown in FIG. 1, the fuel filling apparatus 1 comprises a fuel gas supply path 3, a flow modulating valve V1, an integrating flowmeter F1, a shut-off valve V2, an overfilling protective valve 20, a heat exchanger 4 and a pressure gauge 5. The fuel gas supply path 3 is used for supplying the fuel gas from a reservoir tank 2. The flow modulating valve V1 modulates a supply amount of the fuel gas. The integrating flowmeter F1 measures and integrates a flow of the fuel gas. The shut-off valve V2 closes the fuel gas supply path 3 when filling the fuel gas is finished. The overfilling protective valve 20 will close the supply path 3 when the shut-off valve V2 malfunctions. The heat exchanger 4 is used to cool the fuel gas, and the pressure gauge 5 is used to detect a pressure of the fuel gas that is filled into the automobile.

The hydrogen gas whose temperature rises easily due to the Joule Thomson effect is used as the fuel gas to describe the embodiment.

The heat exchanger 4 is arranged at the secondary side of the overfilling protective valve 20, and is capable of cooling the fuel gas by a refrigerant that is supplied to the heat exchanger 4 by a refrigerant supply means (not shown). In addition, a refrigerant passage 6, for supplying a portion of the refrigerant that is supplied to the heat exchanger 4, is arranged between the heat exchanger 4 and the overfilling protective valve 20.

The aforementioned refrigerant is preferably chemically inactive, and even though the refrigerant leaks out of the heat exchanger 4 due to accident or malfunction, etc., the refrigerant will not react with the fuel gas to cause an ignition or an explosion. Examples of such inactive refrigerants are ethylene, dichloromethane, methanol, liquid nitrogen, and liquid argon, etc.

One end of a connection pipe 11, such as a flexible hose, is connected to an end portion of the fuel gas supply path 3. The other end of the connection hose 11 can be connected through a coupler (not shown) to a fuel gas supply path 14 that is connected to a fuel tank 13 of the automobile 12. A check valve V3 is arranged in the fuel gas supply path 14. The check valve V3 can prevent the fuel gas in the fuel tank 13 from leaking externally.

As shown in FIG. 2, the overfilling protective valve 20 comprises a fuel gas passage 21, a valve unit 22 for opening or closing the fuel gas supply passage 21 by a valve body 30, a valve body displacement means 23 for displacing the valve body 30 based on a filled pressure of the fuel gas, and a temperature modulating unit 24 for modulating the temperature of the valve body displacement means 23.

Further, in the embodiment, a spring is used as an example of the valve body displacement means 23, and the following description refers as the spring 23 to describe the detail operation.

The fuel gas supply passage 21 is connected to the fuel gas supply path 3.

The valve unit 22 comprises a valve rod 31 with the valve body 30, and a valve box 33 having a sliding hole 32 where the valve rod 31 is slidably received therein.

The sliding hole 32 is connected to the fuel gas supply passage 21. The valve body 30 is formed at a location that is equivalent to a valve chest 34 formed in the sliding hole 32.

The spring 23 is received in a spring receiving unit 40, and the spring 23 obtains a repulsive force from the interior of the spring receiving 40 to provide a resilient force in the direction of the valve unit 22 (a downward direction with respect to FIG. 2) to a piston 42 through a ball 41.

The piston 42 is received in a piston receiving unit 43. The piston 42 is fixed on one end of the valve rod 31, so that the piston 42 and the valve rod 31 move together.

A branch path 44, which branches from the fuel gas supply path 3 at the secondary side of the overfilling protective valve 20, is connected to the piston receiving unit 43. The fuel gas within the fuel gas supply path 3 at the secondary side passes through the branch path 44, and then is supplied to between the valve unit 22 and the piston 42 in the piston receiving unit 43.

The temperature modulating unit 24 comprises a temperature sensor 50, a heat exchange unit 51, a control valve 52, a refrigerant discharging path 53, and a control unit 54. The temperature sensor 50 detects a temperature of the spring 23. The heat exchange unit 51 cools the spring 23. The control valve 52 control a refrigerant flow that is supplied to the heat exchange unit 51 by the refrigerant passage 6. The refrigerant discharging path 53 is used to discharge the refrigerant from the heat exchange unit 51. The control unit 54 controls switching on or off the control valve 52 by an output signal of the temperature sensor 50.

The temperature modulating unit 24 can be constructed to maintain the temperature of the spring 23 within a preset temperature range according to the following manner. When a detected value of the temperature sensor 50 is higher than the preset temperature range, the control valve 52 is opened, and when the detected value of the temperature sensor 50 is lower than the preset temperature range, the control valve 52 is closed.

An exemplary operation of the overfilling protective valve 20 is described in detail as below.

Figure 14:
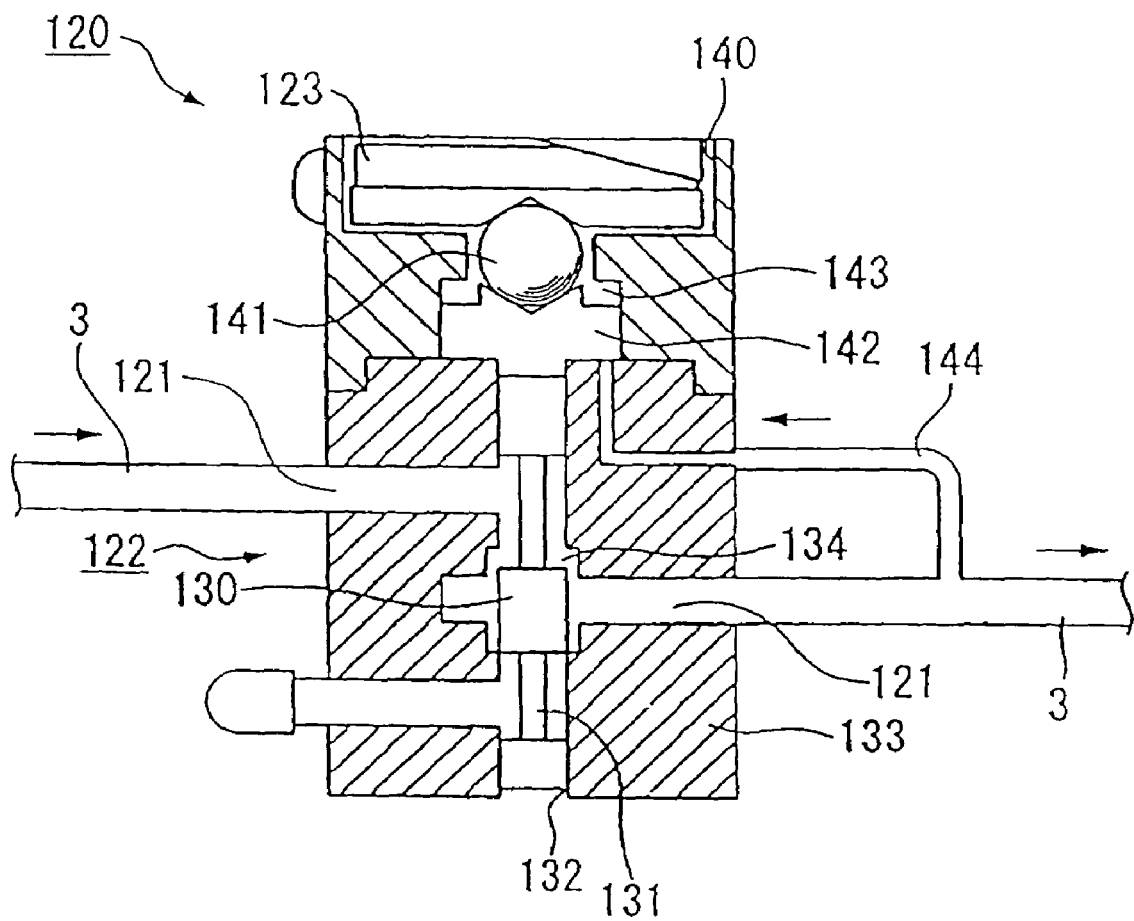
FIG. 14 is a cross-sectional view of an overfilling protective valve used in a conventional fuel filling apparatus.

In the overfilling protective valve 20, the valve unit 22 and the spring 23 operate in the same way as those in the conventional overfilling protective valve 120 shown in FIG. 14, and therefore, descriptions of the related operations are omitted.

When the detected value of the temperature sensor 50 is higher than the preset temperature range, the control valve 52 is opened by the control unit 54, and then the refrigerant is supplied to the heat exchange unit 51 through the refrigerant passage 6. In this way, the spring receiving unit 40 and the spring 23 are cooled.

When the spring 23 is cooled and the detected value of the temperature sensor 50 is lower than the preset temperature range, the control valve 52 is closed by the control unit 54, and then the refrigerant is discharged out of the heat exchange unit 51 through the refrigerant discharging path 53. In this manner, the cooling of the spring 23 is accomplished.

As described above, if the temperature of the spring 23 is maintained within the above preset temperature range, the elastic coefficient of the spring 23 can be kept constant. As a result, the gas pressure at the second side due to switching on or off the fuel gas passage 21 can be maintained constant even though the temperature of the fuel gas or the external temperature, etc. changes. In other words, the overfilling protective valve 20 can operate exactly according to the preset pressure.

As described above, in the fuel filling apparatus 1 of the present embodiment, because the overfilling protective valve 20 comprises the fuel gas path 21, the valve unit 22 for opening and closing the fuel gas path 21 by the valve body 30, the spring 23 for displacing the valve body 30 based on the filling pressure of the fuel gas and the temperature modulating unit 24 for modulating the temperature of the spring 23, the spring 23 can be always maintained within the preset temperature range by the temperature modulating unit 24 and the overfilling protective valve 20 can be exactly operated under the preset pressure. Therefore, the overfilling protective valve 20 can be prevented from operating with a pressure that is obviously deviated from the preset pressure. Therefore, the fuel filling process can be performed with the preset filling pressure.

In addition, since the heat exchanger 4 for cooling the fuel gas is arranged in the fuel gas supply path 3, the fuel gas can be cooled without increasing a required energy for the temperature modulation of the temperature modulating unit 24. As a result, like the hydrogen gas, even for a gas whose temperature rises easily in the fuel filling apparatus, the temperature of the gas before being filled can be reduced, and therefore, the temperature of the fuel tank 13 can be maintained under a preset temperature. In this way, the filling speed for the fuel gas is increased, and thus the fuel gas can be filled in a short time.

Furthermore, since the temperature modulating unit 24 can use the refrigerant supplied to the heat exchanger 4 to cool the spring 23, it is not necessary to include an additional refrigerant supply source for the temperature modulating unit 24, which is different from the refrigerant supply source for the heat exchanger 4. Therefore, the structure of the fuel filling apparatus 1 can be simplified.

Second Embodiment

Figure 3:
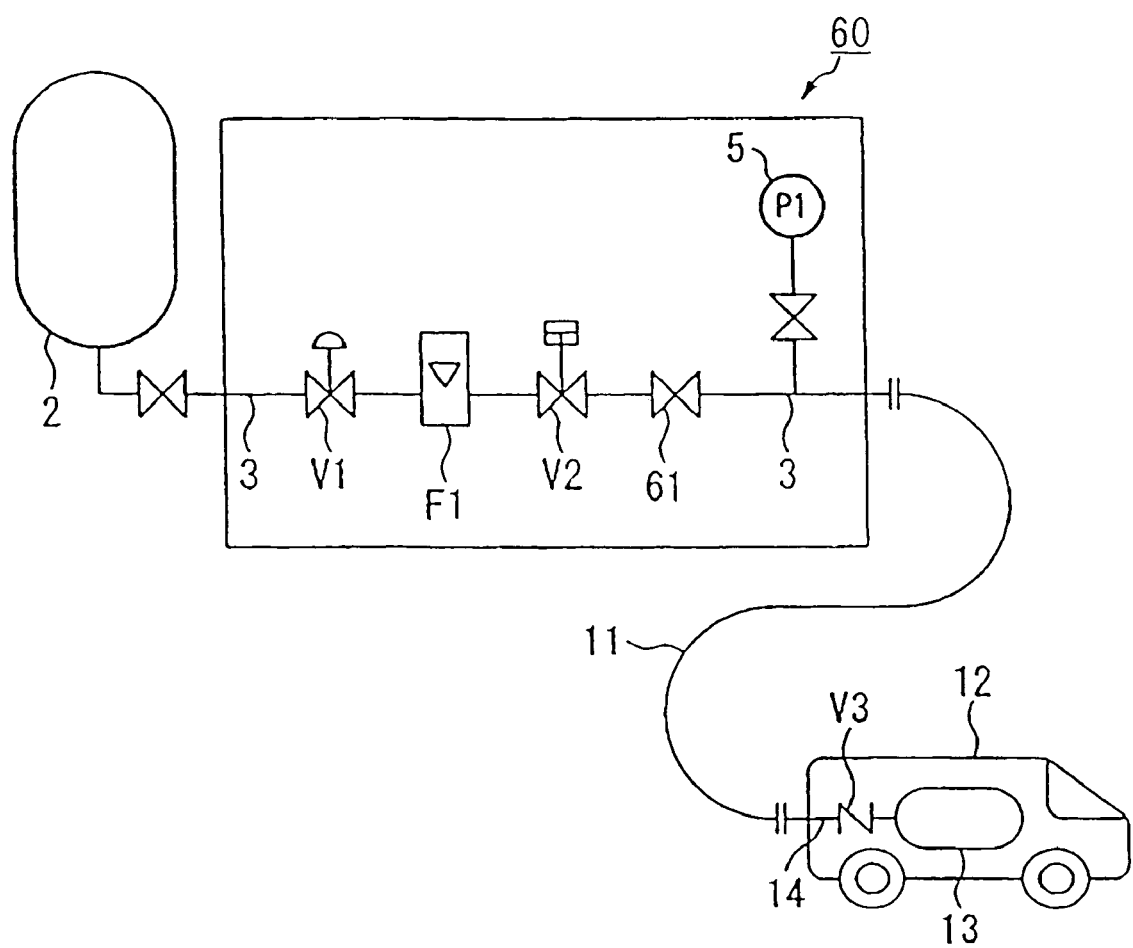
FIG. 3 schematically shows a structure of a fuel filling apparatus according to the second embodiment of the present invention.
Figure 4:
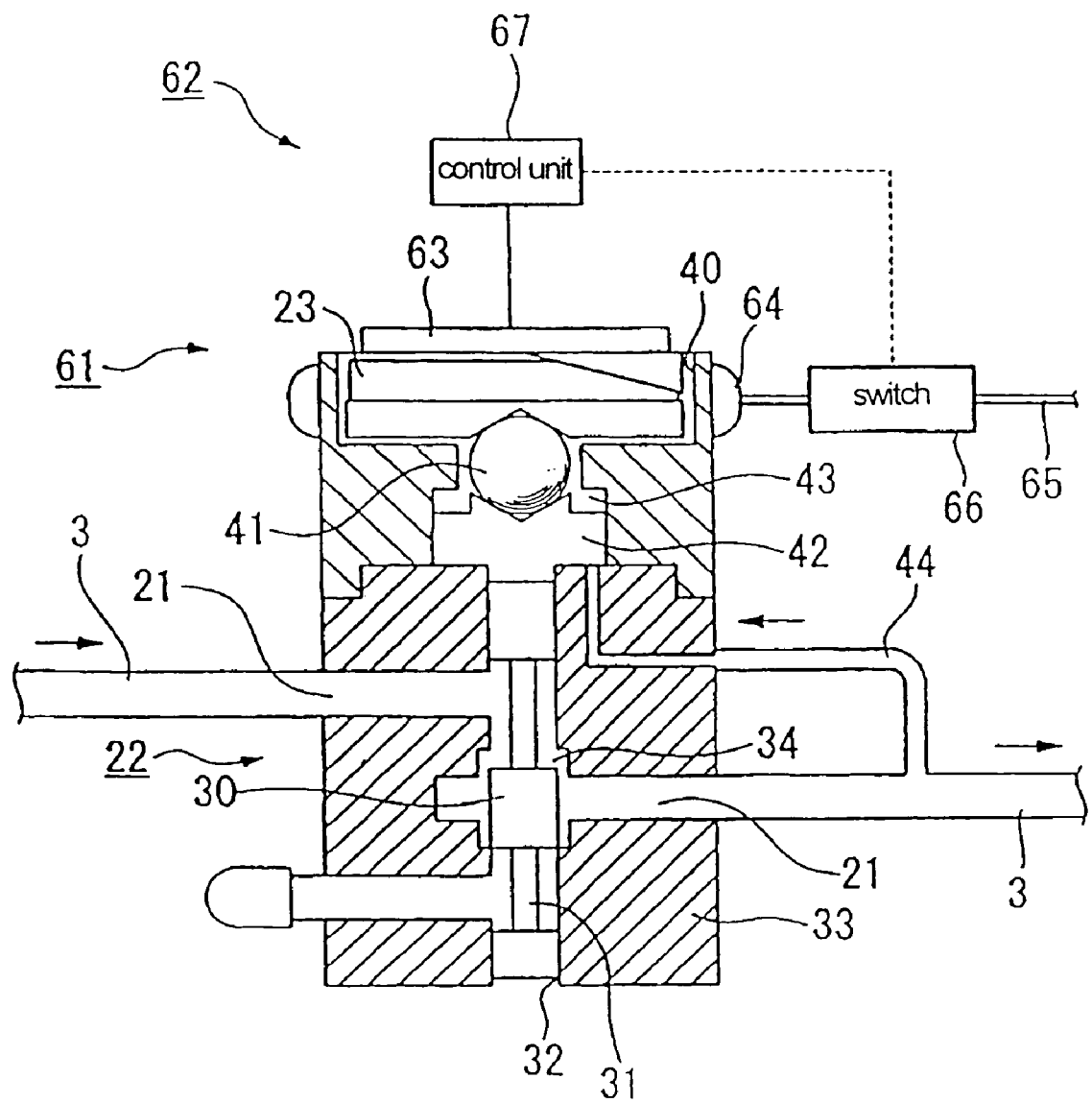
FIG. 4 is an exemplary overfilling protective valve suitable for the fuel filling apparatus according to the second embodiment of the present invention.

FIG. 3 schematically shows a structure of a fuel filling apparatus according to the second embodiment of the present invention. FIG. 4 is a cross-sectional view of an exemplary overfilling protective valve that is applicable to the fuel filling apparatus shown in FIG. 3. The second embodiment is suitable for the compressed nature gas whose temperature will decrease due to the Joule Thomson effect.

The fuel filling apparatus 60 in FIG. 3 basically has the same structure as the fuel filling apparatus in FIG. 1, except for no heat exchanger 4 and the structure of the overfilling protective valve 61 in FIG. 4.

The overfilling protective valve 61 comprises a fuel gas passage 21, a valve unit 22 for opening or closing the fuel gas supply passage 21 by a valve body 30, a valve body displacement means 23 for displacing the valve body 30 based on a filled pressure of the fuel gas, and a temperature modulating unit 62 for modulating the temperature of the spring 23.

The temperature modulating unit 62 comprises a temperature sensor 63, a heater 64, a switch 66 and a control unit 67. The temperature sensor 63 is used to detect the temperature of the spring 23, and the heater 64 is used to heat the spring 23. The switch 66 is arranged on a wire 65 that provides power to the heater 64. The control unit 66 controls the switch 66 to supply or to stop supplying power to the heater 64 according to a detected value of the temperature sensor 63.

The temperature modulating unit 62 can be constructed to maintain the temperature of the spring 23 within a preset temperature range according to the following manner. When the detected value of the temperature sensor 63 is less than the preset temperature range, the switch 66 is operated so as to supply the power to the heater 64. Alternatively, when the detected value of the temperature sensor 63 reaches the preset temperature range, the switch 66 is operated so as to stop supplying the power to the heater 64.

As described above, in the fuel filling apparatus 60 of this embodiment, since the overfilling protective valve 20 comprises the fuel gas passage 21, the valve unit 22 for opening or closing the fuel gas supply passage 21 by the valve body 30, the valve body displacement means 23 for displacing the valve body 30 based on the filled pressure of the fuel gas, and the temperature modulating unit 62 for modulating the temperature of the spring 23, the temperature of the spring 23 can always maintain within the preset temperature range by using the temperature modulating unit 62, so that the overfilling protective valve can operate exactly based on the preset pressure. Therefore, disadvantages, which the overfilling protective valve 20 operates under a pressure that deviates obviously from the preset pressure, can be effectively avoided. As a result, even for the fuel gas, like the compressed nature gas, whose temperature decreases easily within the fuel filling apparatus, the fuel gas can be filled under the preset filling pressure.

The above descriptions are made according to preferred embodiments of the present invention, but those embodiments are not used to limit ways of implementations. Various modifications of the embodiment within the scope of the present invention will be apparent to those skilled in the art.

For example, the temperature modulating unit can comprise both of the heater for increasing the temperature of the valve body displacement means and the heat exchanger for reducing the temperature of the valve body displacement means. Namely, the temperature of the spring 23 can be maintained within the preset temperature range in the following manner. When the detected value of the temperature sensor is higher than the preset temperature range, the heat exchange is activated to cool the valve body displacement means. When the detected value is lower than the preset temperature range, the heater is activated to heat the valve body displacement means.

In this manner, for example, even though the temperature variation of the environment at which the fuel filling apparatus is set is rapid, the temperature of the valve body displacement means can be exactly maintained within the preset temperature range. Therefore, disadvantages, which the overfilling protective valve 20 operates under a pressure that deviates obviously from the preset pressure, can be effectively avoided.

In addition, the heat exchanger can also be arranged at the primary side of the overfilling protective valve.

Third Embodiment

Figure 5:
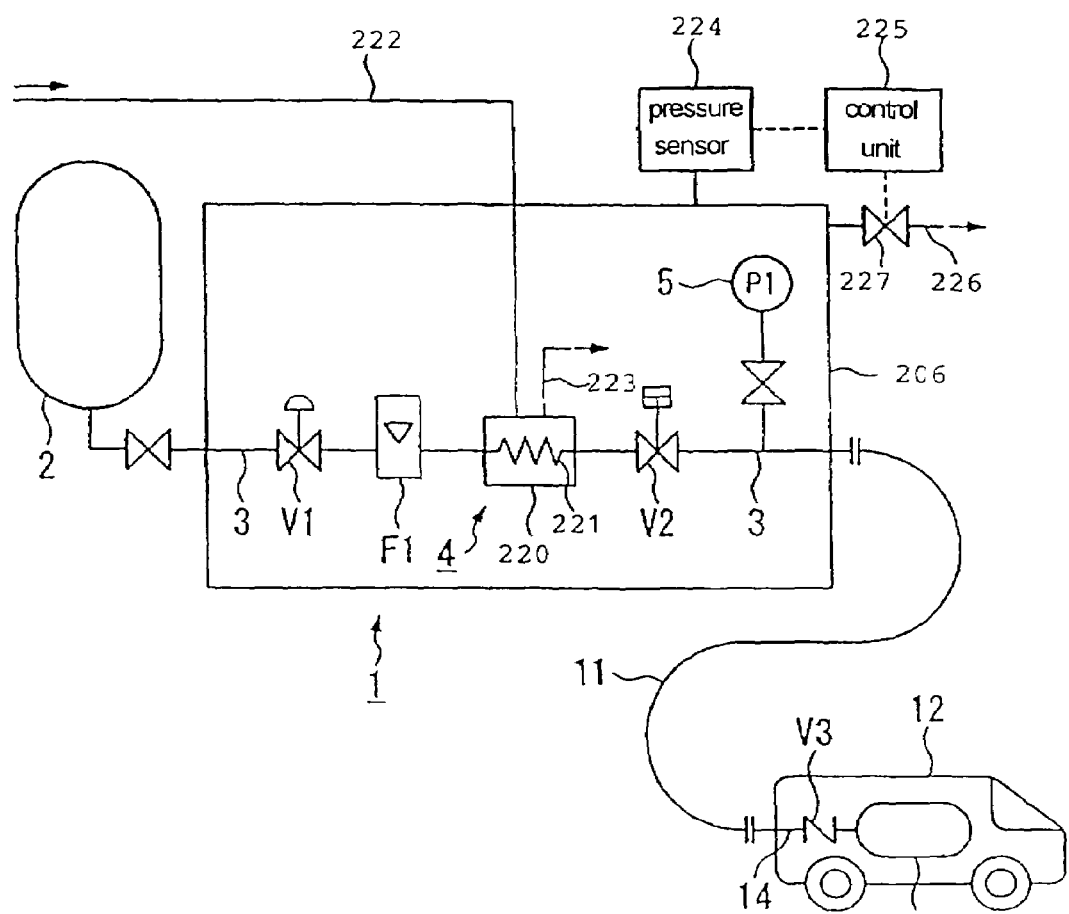
FIG. 5 schematically shows a structure of a fuel filling apparatus according to the third embodiment of the present invention.

FIG. 5 shows another structure of the fuel filling apparatus according to the third embodiment of the present invention.

In FIG. 5, the fuel filling apparatus 1 has a casing 206 in which a hydrogen gas supply path 3, a flow modulating valve V1, an integrating flowmeter F1, a heat exchanger 4, a shut-off valve V2 and a pressure gauge 5 are arranged. The fuel gas supply path 3 is used for supplying the hydrogen gas from a hydrogen gas reservoir tank 2. The flow modulating valve V1 modulates a supply amount of the hydrogen gas. The integrating flowmeter F1 measures and integrates a flow of the hydrogen gas. The shut-off valve V2 is arranged in the hydrogen gas supply path 3. The heat exchanger 4 is used to cool the hydrogen gas, and the pressure gauge 5 is used to detect a pressure of the hydrogen gas that is filled into the automobile.

The casing 206 is made of a rigid material such as metal (e.g., stainless, etc.) or plastic (e.g., acryl resin, etc.). The casing is preferably an air-tight structure, but is not necessary to be a rigorous air-tight structure. For example, the casing can be an air-tight structure wherein gasified inert gas in the heat exchanger 4 can maintain a positive pressure within the casing 206 and does not leak over a preset amount.

The heat exchanger 4 comprises a container 220 made of stainless, etc., and a hydrogen gas flow path 221 arranged in the container 220. The hydrogen gas flow path 221 is connected to the hydrogen gas supply path 3. In addition, liquid inert gas is supplied to the container 220 through a liquid inert gas supply path 222 from a liquid inert gas tank (not shown). In addition, an inert gas discharging path 223, having a discharging outlet that is open towards the casing interior, is connected to the container 220. Therefore, the inert gas gasified within the container 220 can be discharged to the casing interior through the inert gas discharging path 223.

The heat exchanger 4 is preferably constructed in a manner that a supply amount of the liquid inert gas to the container 220 can be controlled according to a liquid level of the liquid inert gas in the container wherein the liquid level is detected by a liquid level sensor (not shown). According to the above configuration, the amount of the liquid inert gas within the container 220 can be maintained substantially constant.

In addition, preferably, the hydrogen gas flow path 221 of the heat exchanger 4 is formed in a coil shape, and heat sinks (heat dissipating plates) are arranged on the external of the hydrogen gas flow path 221. In this manner, the heat exchange efficiency between the hydrogen gas and the liquid inert gas can be increased.

The liquid inert gas is a gas at the room temperature and is chemically inactive. Further, the liquid inert gas can prevent the hydrogen gas from ignition or explosion by diluting the hydrogen gas. More specifically, a liquid nitrogen or a liquid argon, etc. can be an example for the liquid inert gas. The liquid nitrogen is preferred because of the advantages of its low price and stable supply.

One end of a connection pipe 11, such as a flexible hose, is connected to an end portion of the fuel gas supply path 3. The other end of the connection hose 11 can be connected through a coupler (not shown) to a hydrogen gas supply path 14 that is connected to a fuel tank 13 of the automobile 12.

A check valve V3 is arranged in the hydrogen gas supply path 14 of the hydrogen gas automobile 12. The check valve V3 can prevent the hydrogen gas in the fuel tank 13 from leaking externally.

Furthermore, the fuel filling apparatus 1 of the embodiment preferably comprises a pressure sensor 224, an exhaust valve 227 and a control unit 225. The pressure sensor 224 is used to detect an inner pressure of the casing 206. The exhaust valve is arranged on an exhaust path 226 that is used for exhausting the gas in the casing 206. The control unit 225 controls the exhaust valve 227 to open or close according to a detected value of the pressure sensor 224.

Next, a method for filling the hydrogen gas to the hydrogen gas automobile 12 is described by using the fuel filling apparatus of the embodiment.

First, before filling the hydrogen gas to the automobile 12, the liquid inert gas is supplied to the heat exchanger 14 to sufficiently reduce the temperature of the heat exchanger 4. In addition, the inert gas created by the gasification of the liquid inert gas is discharged to the interior of the casing 206. The air in the casing 206 is driven out of the casing by the inert gas, and then the casing interior becomes an inert gas environment.

For filling fuel, the connection pipe 11 is connected to the hydrogen automobile 12 that arrives at the fuel filling apparatus 1. Next, the shut-off valve V2 is opened, and the hydrogen gas from the hydrogen gas reservoir tank 2 is conducted to the hydrogen gas supply path. The supply amount of the hydrogen gas can be modulated to a suitable value by the flow modulating valve V1. When the hydrogen passes through the flow modulating valve V1, the temperature of the hydrogen gas rises due to the Joule Thomson effect.

The hydrogen gas passing through the flow modulating valve V1 is guided into the hydrogen gas flow path 221 of the heat exchanger 4. The liquid inert gas is guided into the container 220 of the heat exchanger 4 through the liquid inert gas supply path 222. The liquid inert gas exchanges heat with the hydrogen gas in the hydrogen gas flow path 221, and therefore, the hydrogen gas is cooled. The hydrogen gas cooled by the heat exchanger 4 is then filled into the fuel tank 13 through the shut-off valve V2, the connection pipe 11 and the hydrogen gas supply path 14.

In addition, a portion of the liquid inert gas is gasified by cooling the hydrogen gas in the hydrogen gas flow path 221. The gasified inert gas is then discharged to the interior of the casing 206 through the inert gas discharging path 223.

Regarding the heat exchanger 4, the liquid inert gas is preferably supplied to the container 220 from the liquid inert gas supply path 222 according to a reduced amount caused by gasification. In this manner, the amount of the liquid inert gas in the container 220 can be maintained above a preset value, and furthermore, the pressure of the inert gas in the casing 206 can be also maintained above a preset value.

The inner pressure of the casing 206 is maintained at a positive pressure by controlling the exhaust valve 227 to open or close according to the inner pressure of the casing 206 detected by the pressure sensor 224.

More specifically, when the detected value of the pressure sensor 224 is lower than a preset pressure range, a detection signal corresponding to the detected value is transmitted to the control unit 225. A control signal corresponding to the detection signal is transmitted to the exhaust valve 227, and then the exhaust value is close according to the control signal. In this manner, the inert gas discharged from the heat exchanger 4 stays in the casing 206, so that the inner pressure of the casing can be increased. In addition, as the detected value of the pressure sensor 224 exceed the above preset pressure range, a detection signal corresponding to the detected value is transmitted to the control unit 225. A control signal corresponding to the detection signal is transmitted to the exhaust valve 227, and then the exhaust value is opened according to the control signal to exhaust the redundant inert gas.

As described above, since the fuel filling apparatus of the present embodiment comprises the heat exchanger 4 for cooling the hydrogen gas by the liquid inert gas, the hydrogen gas can be effectively cooled and the hydrogen gas with a low temperature can be filled into the fuel tank 13. Therefore, even though the temperature of the hydrogen gas rises during passing the flow modulating valve V1, the hydrogen gas can be cooled by the heat exchanger 4 and the temperature of the hydrogen gas can be reduced before the hydrogen gas is filled into the fuel tank 13. Therefore, since the temperature of the fuel tank 13 can be exactly maintained under the preset temperature range, the speed for filling hydrogen gas can be increased and the hydrogen gas can be filled in a short time.

In addition, the liquid inert gas is gasified due to the heat exchange with the hydrogen gas, and the obtained inert gas is discharged to the interior of the casing 206 of the fuel filling apparatus 1. Therefore, the casing 206 is maintained in an inert gas environment, so that the concentrations of the hydrogen gas and the oxygen gas in the casing 206 can be always maintained at a very low level. As a result, the hydrogen gas explosion can be avoided in advance.

The inert gas created by the gasification of the liquid inert gas is used as a protective gas, and therefore, the electric parts used in the fuel filling apparatus can be considered as a structure of inner pressure explosion proof that is specified by JIS C0932. Therefore, an inexpensive and safe fuel filling apparatus 1 can be achieved by a simpler structure.

Fourth Embodiment

A fuel filling apparatus according to the fourth embodiment of the present invention is described in detail as follows.

Figure 6:
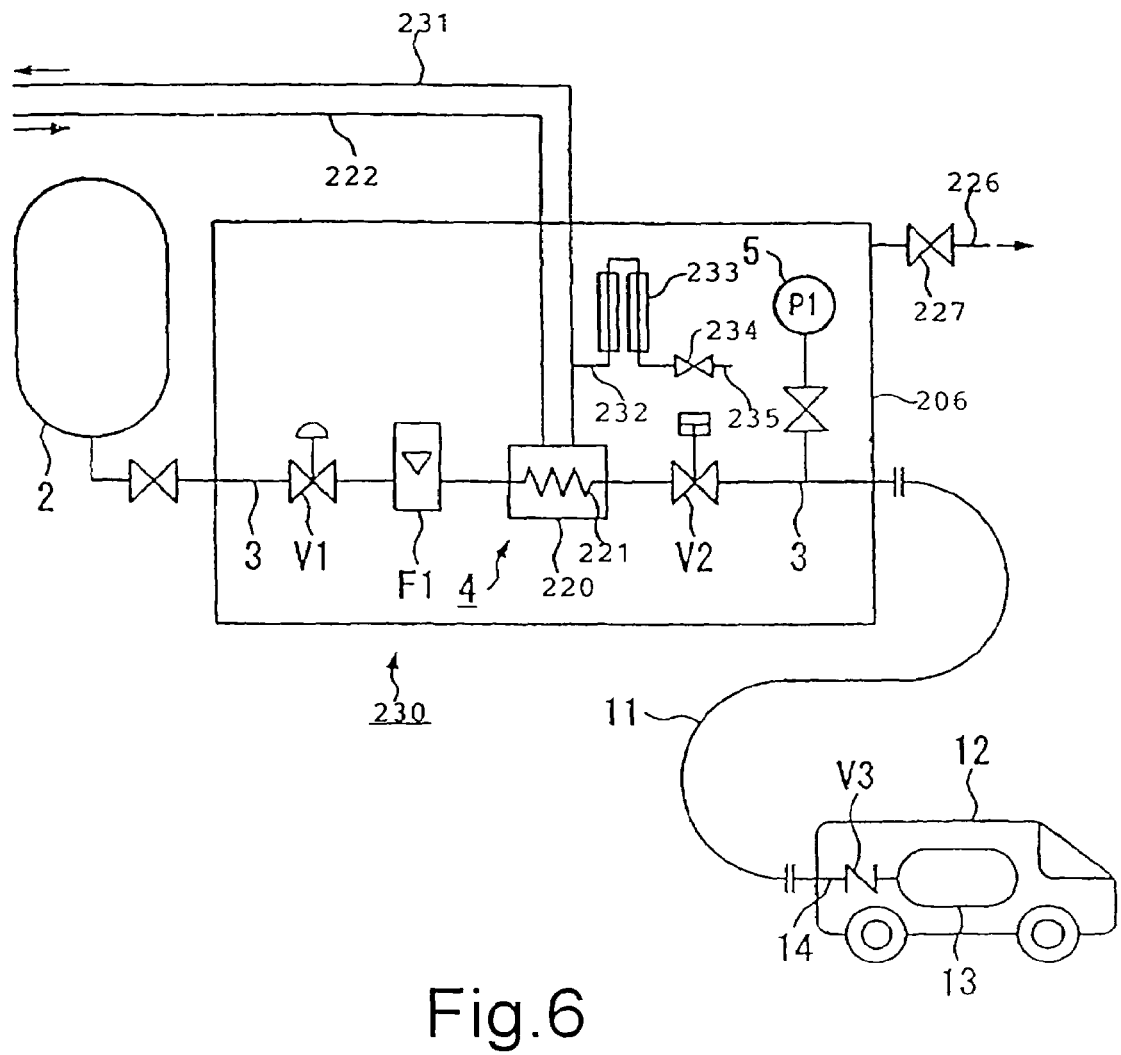
FIG. 6 schematically shows a structure of a fuel filling apparatus according to the fourth embodiment of the present invention.

FIG. 6 schematically shows an exemplary structure of the fuel filling apparatus according to the fourth embodiment of the present invention. In FIG. 6, numbers the same number as those in FIG. 5 mean the same or similar structure, and their corresponding descriptions are omitted.

In the fuel filling apparatus 230 of the present embodiment, only a portion of the liquid inert gas provided to the heat exchanger 4 is discharged to the interior of the casing 206.

As shown in FIG. 6, the supply path 22 for the liquid inert gas and a discharging path 231 are connected to the heat exchanger 4. In addition, a pipe 232 is branched from the liquid inert gas discharging path 231, and an evaporator 233 is connected to the pipe 232. An inert gas discharging path 235 with a discharging valve 234 is connected to the evaporator 233.

Regarding the evaporator 233, a contact area with the gas in the casing 206 is enlarged by using heat dissipating plates (heat sinks), etc., and the liquid inert gas in the pipe 232 is heated to gasify by exchanging heat with the gas in the casing 206. The inert gas gasified by the evaporator 233 passes through the inert gas discharging path 235, and then is discharged to the interior of the casing 206.

In addition, the discharging valve 234 can modulate a discharging amount of the liquid inert gas from the evaporator 233 by setting a predetermined aperture.

The evaporator 233, for example, can be constructed in a manner that a certain amount liquid inert gas is regularly gasified and then the obtained inert gas is discharged to the interior of the casing 206. In addition, the evaporator 233 can also be controlled in a manner that the liquid inert gas with an amount corresponding to a reduced amount of the inner pressure is gasified according to a detection signal from a pressure gauge (not shown) that is used to measure the inner pressure of the casing 206. Alternatively, the evaporator 233 can also be constructed in a manner in which the evaporator 233 and the exhaust valve 227 are controlled to operate together by way of the gasified amount of the inert gas of the evaporator 233 and the discharged amount of the inert gas from the exhaust valve 227 being balanced.

When the gasified amount of the inert gas from the evaporator 233 can be sufficiently large, even though the exhaust valve 227 is always open with a fixed aperture, entrance of external gas can be avoided. Therefore, the opening or closing of the exhaust valve 227 can also be controlled regardless of the inner pressure of the casing 206.

According to the fuel filling apparatus 230, similar to the fuel filling apparatus 1 shown in FIG. 3, since the inert gas, obtained by gasifying the liquid inert gas by exchanging heat with the hydrogen gas, can be discharged to the interior of the casing 206, the casing 206 is maintained in an inert gas environment, and the fuel filling apparatus 230 can be constructed to a structure of inner pressure explosion proof. Therefore, an inexpensive and safe fuel filling apparatus 230 can be constructed by a simpler structure.

In addition, because a supply amount of the liquid inert gas from the liquid inert gas supply path 222 to the heat exchanger 4 can be increased and the redundant liquid inert gas can be discharged through the liquid inert gas discharging path 231, the flow speed of the liquid inert gas in the heat exchanger 4 is increased and the heat exchange efficiency between the liquid inert gas and the hydrogen gas can be improved. Therefore, the cooling ability of the heat exchanger 4 can be improved.

Fifth Embodiment

Figure 7:
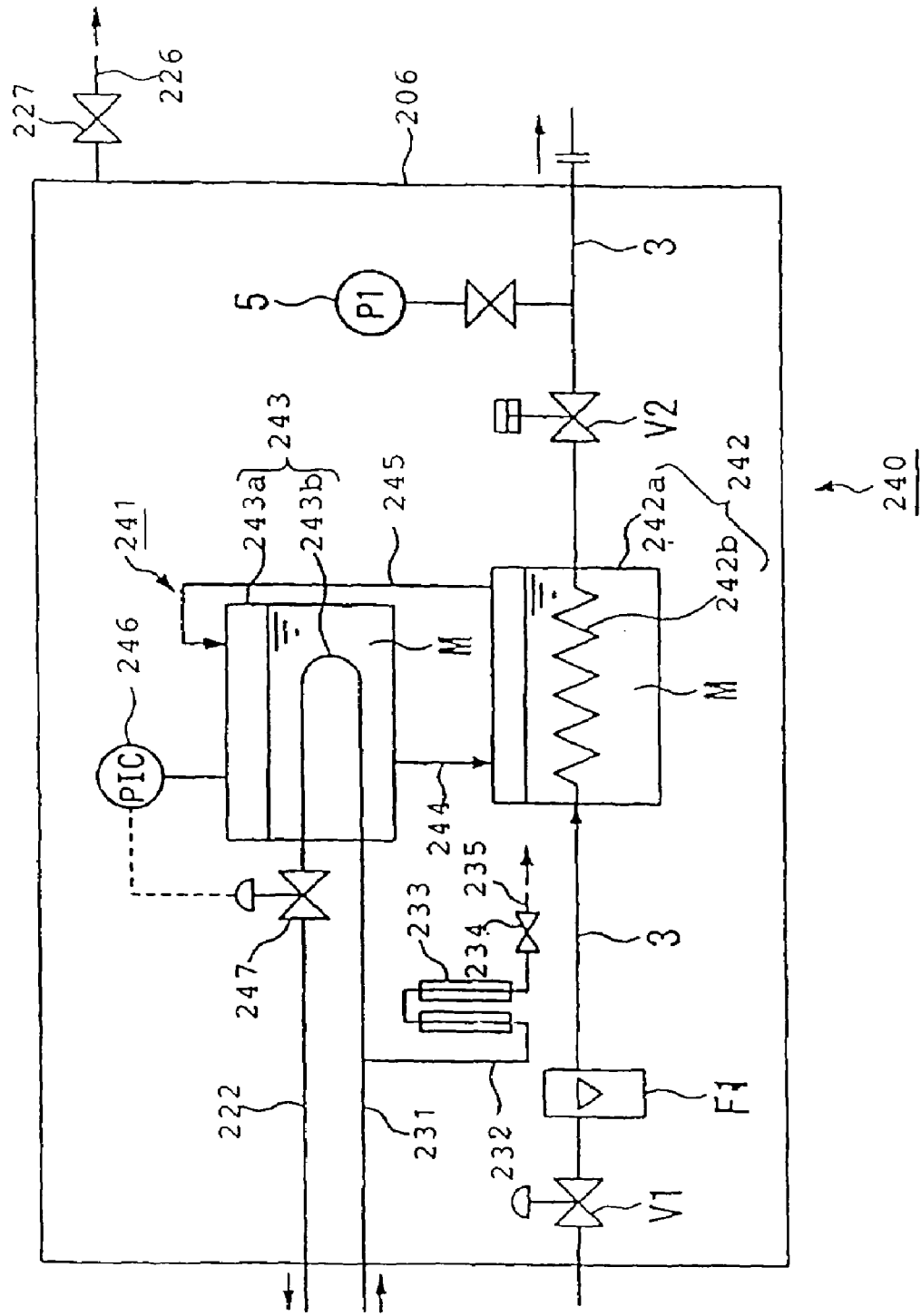
FIG. 7 schematically shows a structure of a fuel filling apparatus according to the fifth embodiment of the present invention.

A fuel filling apparatus according to the fifth embodiment of the present invention is described in detail as follows. FIG. 7 schematically shows an exemplary structure of the fuel filling apparatus 240 according to the fifth embodiment of the present invention. In FIG. 7, the same numbers as those in FIGS. 5 and 6 mean the same or similar structure, and their corresponding descriptions are omitted. In the fuel filling apparatus 240 of the present embodiment, only a portion of the liquid inert gas provided to the heat exchanger 4 is discharged to the interior of the casing 206.

In the fuel filling apparatus 240, the heat exchanger 241 comprises a first heat exchange unit 242 and a second heat exchange unit 243, wherein the first heat exchange unit 242 is used to cool the hydrogen gas by using an intermediate medium M, and the second heat exchange unit 243 is used to cool the intermediate medium M by using the liquid inert gas.

The first heat exchange unit 242 comprises a first container 242a for receiving the intermediate medium M and a hydrogen gas flow path 242b arranged in the first container 242a. The hydrogen gas flow path 242b is connected to the hydrogen gas supply path 3.

In addition, the second heat exchange unit 243 comprises a second container 243a for receiving the intermediate medium M and a liquid inert gas flow path 243b arranged in the second container 243a. The liquid inert gas flow path 243b is connected to the liquid inert gas supply path 222 and the liquid inert gas discharging path 231.

The first and the second containers 242a, 243a is constructed to an airtight structure against the exterior.

The intermediate medium M is preferably a fluid that is liquidized by cooling by the liquid inert gas and is not solidified. For example, the intermediate medium M can use methanol, dichloromethane, and fluorinert, etc. The intermediate medium M is in an equilibrium state with the gas and the liquid within the first and the second containers 242a, 243a.

The upper part of the first container 242a and the lower part of the second container 243a are connected by a first connection path 244. In addition, the upper part of the first container 242a and the upper part of the second container 243a are connected by a second connection path 245.

In this manner the heat exchanger 241 can introduce the liquid intermediate medium M into the second container 243a through the first connection path 244 into the first container 242a, and introduce the gas intermediate medium M into the first container 242a through the second connection path 245 into the second container 243a.

The intermediate medium M in the heat exchanger 241 is circulated between the first and the second containers 242a, 243a through the first and the second connection paths 244, 245.

More specifically, the intermediate medium M is cooled in the second container 243a by the liquid inert gas that flows in the liquid inert gas flow path 244, moving to the first container 242a through the first connection path 244 where the intermediate medium M is further cooled by the hydrogen gas that flows in the hydrogen flow path 242b. The intermediate medium M, which is gasified by heat obtained from the hydrogen gas, moves to the second container 243a through the second connection path 245. In the second container 243a, the intermediate medium M is further cooled by the liquid inert gas that flows in the liquid inert gas flow path 243b, and then liquidizes again.

A pressure indication modulator 246 for measuring a gas-phase pressure of the intermediate medium M is arranged in the heat exchanger 241. The pressure indication modulator 246 is controlled in the following manner. When the intermediate medium M is gasified by the cooling of the hydrogen gas and the gas-phase pressure of the intermediate medium M is larger than a prescribed value, a modulating valve 247 arranged in the liquid inert gas supply path 222 is open, and when the gas-phase pressure of the intermediate medium M is less than the prescribed value, the modulating valve 247 is closed.

In this manner, when the gas-phase pressure of the intermediate medium M is larger than the prescribed value, the liquid inert gas flows to the liquid inert gas flow path 243b. The intermediate medium M is cooled to reduce its gas-phase pressure. In contrast, if the gas-phase pressure of the intermediate medium M is less than the prescribed value, the modulating valve 247 is closed and the liquid inert gas stop flowing, so as to stop cooling the intermediate medium M.

Therefore, the gas-phase pressure of the intermediate medium M can be maintained within a predetermined range. Namely, the temperature of the intermediate medium M can be maintained within a predetermined range under a gas-liquid equilibrium state.

According to the fuel filling apparatus 240, the liquid inert gas is supplied to the heat exchanger where the intermediate medium M is filled, and the intermediate medium M is cooled by the liquid inert gas to modulate its temperate within the predetermined range, so that the hydrogen gas can be cooled by using the intermediate medium M. Therefore, the cooling temperature of the hydrogen gas can be precisely modulated.

The aforementioned description is explicated based on a preferred embodiment, but various modifications of the embodiment will be apparent to those skilled in the art under the true scope of the invention.

In the above embodiment, the heat exchanger 241 is installed in the casing 206 is an exemplary description, which is not used to limit the scope of the current invention. For example, the heat exchanger 241 can be externally installed to the casing 206. In this case, a same effect can be achieved by introducing the inert gas gasified by the heat exchange to the casing 206.

In addition, an oxygen densitometer and a hydrogen densitometer can be arranged in the casing 206 to monitor the concentrations of the hydrogen and the oxygen. In this case, the flow of the liquid inert gas supply path 222, the gasification amount of the evaporator 233, and the switching of the exhaust valve 227, etc. is controlled according to detected values of the oxygen and the hydrogen densitometers. Therefore, if the oxygen and the hydrogen can be diluted to discharge by increasing the supply amount of the liquid inert gas before the concentration of the oxygen or the hydrogen rises, the safety can be further improved.

Sixth Embodiment

Figure 8:
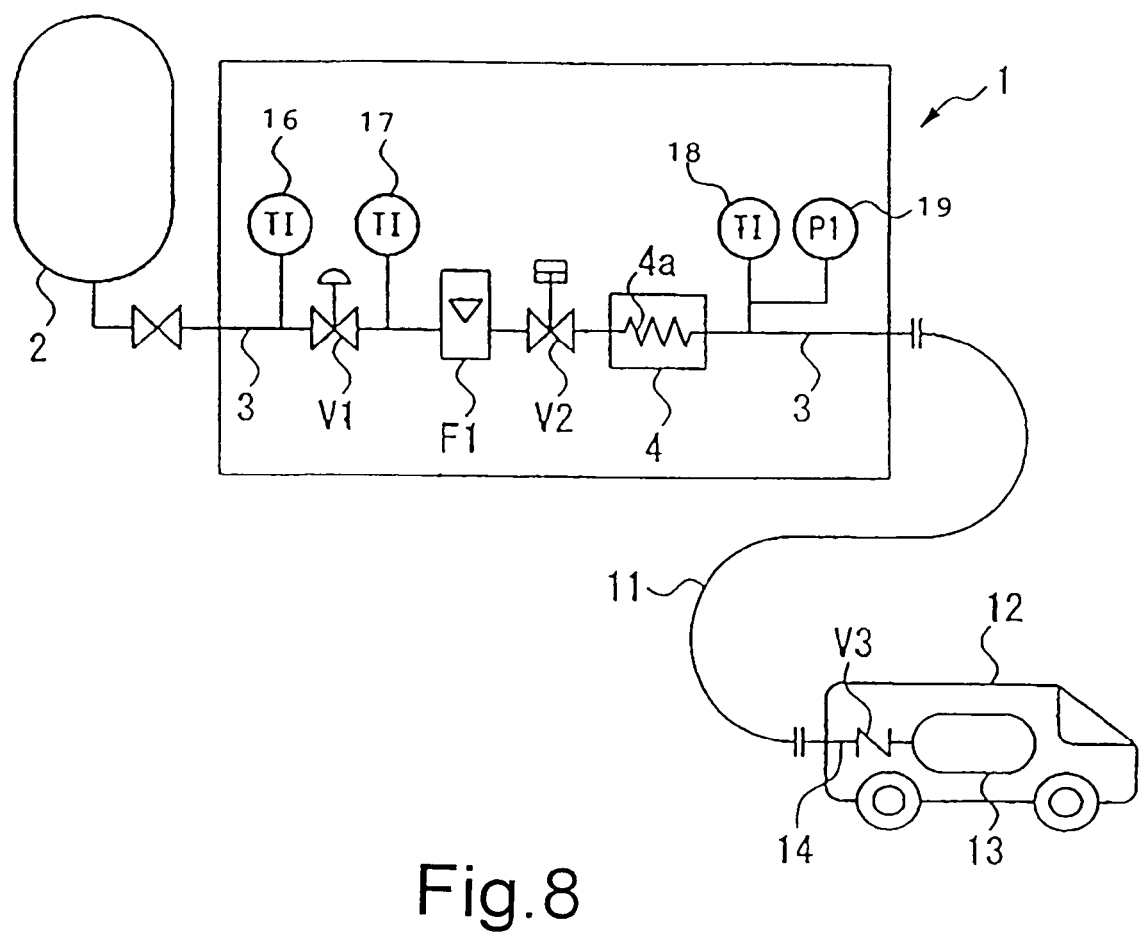
FIG. 8 schematically shows a structure of a fuel filling apparatus according to the sixth embodiment of the present invention.

FIG. 8 shows a fuel filling apparatus according to the sixth embodiment of the present invention.

In FIG. 8, the fuel filling apparatus 1 comprises a supply path 3, a flow modulating valve V1, an integrating flowmeter F1, a shut-off valve V2 and a heat exchanger (cooling means) 4. The supply path 3 is used for supplying the hydrogen gas from a hydrogen gas reservoir tank 2. The flow modulating valve V1 modulates a supply amount of the hydrogen gas. The integrating flowmeter F1 measures and integrates a flow of the hydrogen gas. The shut-off valve V2 is arranged in the supply path 3. The heat exchanger 4 is used to cool the hydrogen gas.

A first thermometer 16 and a second thermometer 17 for detecting the temperature of the hydrogen gas are respectively arranged at the primary side (the upstream side of flow direction of the hydrogen gas) of the flow modulating valve V1 and the secondary side (the downstream side) of the supply path 3.

A filled gas thermometer (means for detecting the temperature of the filled gas) 18 for detecting a temperature of the filled hydrogen gas and a pressure gauge (pressure detecting means) 19 for detecting a pressure of the filled hydrogen gas are arranged in the supply path 3 at the secondary side of the heat exchanger 4.

The heat exchanger 4 comprises a hydrogen gas flow pipe 4a causing the hydrogen gas to flow, wherein the hydrogen gas in the hydrogen flow pipe 4a can be cooled by using a refrigerant.

The heat exchanger 4 can use a chilling cooler where ethylene glycol is used as the refrigerant. In this case, a circulation path to circulate the refrigerant is connected to the heat exchanger 4. In addition, a plate fin type heat exchanger using air as the refrigerant can be also used.

In addition, other heat exchangers, such as a heat exchanger where the hydrogen gas can be directly cooled by refrigerant, such as liquid nitrogen Freon (chlorofluorocarbon), etc., or a heat exchanger where other refrigerant is cooled by liquid nitrogen or freon (flon), etc. and the hydrogen gas is cooled by the refrigerant, can be also used.

In addition, the above constitutive mechanical parts are not necessary to be received in the fuel filling apparatus. For example, if the flow modulating valve is installed to another location near the hydrogen gas reservoir tank 2, the hydrogen gas whose temperature is increased due to passing through the flow modulating valve is cooled by the air before the hydrogen gas reaches the heat exchanger 4, and therefore, the cooling energy at the heat exchanger 4 can be saved.

One end of a connection pipe 11, such as a flexible hose for supplying the hydrogen gas from the fuel filling apparatus 1 to an automobile 12, is connected to an end portion of the fuel gas supply path 3.

The other end of the connection hose 11 can be connected through a coupler (not shown) to a supply path 14 of the automobile 12. A check valve V3 is arranged in the supply path 14 of the automobile 12. The check valve V3 can prevent the fuel in the fuel tank 13 from leaking externally.

A method using the fuel filling apparatus 1 to fill the hydrogen gas to the fuel tank 13 of the hydrogen automobile 12 is described in detail as follows.

A connection pipe 11 is connected to the hydrogen automobile 12 that arrives to the fuel filling apparatus 1 for filling fuel.

The shut-off valve V2 is open, and then the hydrogen gas is introduced from the reservoir tank 2 to the supply path 3. The supply flow of the hydrogen gas can be modulated to a suitable value by the flow modulating valve V1.

When the hydrogen gas passes through the flow modulating valve V1, its temperature rises due to the Joule Thomson effect.

The hydrogen gas is cooled by the refrigerant at the heat exchanger 4. When a chilling cooler Is used as the heat exchanger 4, the hydrogen gas is cooled by tile refrigerant, i.e., ethylene glycol. The hydrogen gas cooled by the heat exchanger 4 passes through the connection pipe 11 and the supply path 14, and then is filled to the fuel tank 13.

Since the fuel filling apparatus 1 comprises the heat exchanger 4 for cooling the hydrogen gas, the hydrogen gas with a low temperature can be filled into the fuel tank 13.

Therefore, even though the temperature of the hydrogen gas rises when the hydrogen gas passes through flow modulating valve V1, the temperature of the fuel tank 13 can be prevented from exceeding a preset temperature.

The temperature of the fuel tank 13 can be exactly maintained under the preset temperature.

In addition, comparing with the conventional filling method of measuring the temperature of the fuel tank during the fuel filling operation, the temperature management of the fuel tank 13 of the present invention is easier, so that the fuel filling can be implemented by a simple operation.

Seventh Embodiment

Figure 9:
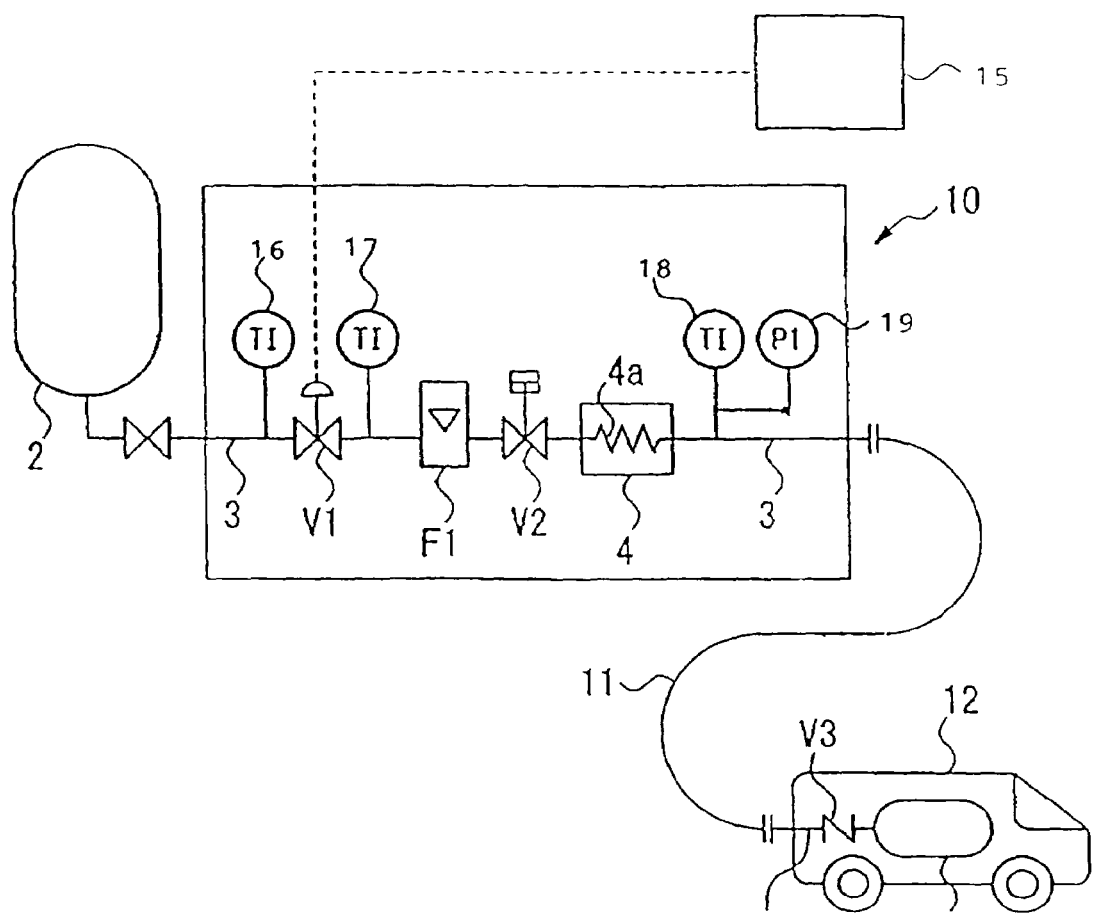
FIG. 9 schematically shows a structure of a fuel filling apparatus according to the seventh embodiment of the present invention.

FIG. 9 shows a fuel filling apparatus according to the seventh embodiment of the present invention.

Figure 10:
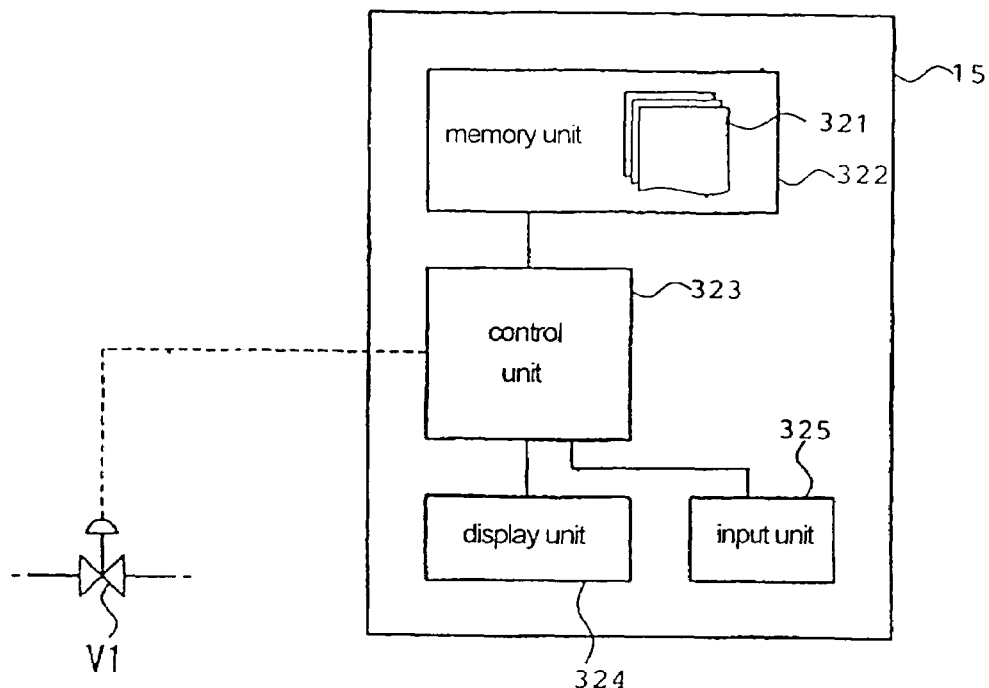
FIG. 10 is a block diagram showing control means of the fuel filling apparatus in FIG. 9.

In FIG. 9, the fuel filling apparatus 10 comprises a control means 15 for controlling a supply amount of the hydrogen gas, which is different from the fuel filling apparatus in FIG. 8. FIG. 10 schematically shows a configuration of the control means 15 in FIG. 9.

As shown in FIG. 10, the control means 15 comprises a memory unit 322 for storing a temperature history data base 321, a control unit 323 for controlling a hydrogen gas supply amount by modulating an aperture of the flow modulating valve V1, and a display unit for displaying detected values and calculation results, and an input unit 325 for inputting preset values, etc.

The temperature history data base 321 comprises data showing a relationship among a temperature T1 in the fuel tank 13 before filling the hydrogen gas (temperature in the tank before filling), a temperature T2 of the hydrogen gas fill to the fuel tank (temperature of fill gas), a releasing speed α of the flow modulating valve V1, and a temperature in the fuel tank 13 during the fuel filling operation.

Namely, the temperature history data base 321 is a data base comprising a result that predetermined values respectively for the temperature in the tank before filling T1, the temperature of fill gas T2 and the releasing speed α of the flow modulating valve V1 are previously set to carry out an experiment of actually filling fuel to the fuel tank, and then a temperature variation in the fuel tank at that time is investigated.

Additionally, in the fuel filling experiment, the fuel filling is preferably performed from a zero inner pressure of the tank to a designed pressure (for example, 35 MPa). A standard fuel tank with a capacity of 150 liter for the hydrogen automobile is preferred.

The temperature history data base 321 can be input or updated by using input means, such as a keyboard.

The temperature in the tank before filling T1 is the temperature in the fuel tank 13 before the fuel is filled into the fuel tank 13. The temperature in the tank before filling T1 is generally deemed to be affected by an environment temperature during the hydrogen automobile 12 runs.

When the environment temperature that the hydrogen automobile 12 can be used is assumed to be in a range of −40 to 50° C., the temperature in the tank before filling T1 can also be assumed to the range of−40 to 50° C.

The temperature of fill gas T2 is a temperature of the hydrogen gas that is to be filled into the fuel tank 13, and can be determined according to a cooling ability and settings of the heat exchanger 4.

For example, when the heat exchanger 4 uses a chilling cooler with a refrigerant of 50 wt % ethylene glycol, the temperature of fill gas T2 can be assumed to be a lower limit of −20° C. (the lowest cooling temperature) and an upper limit of 10° C.

The releasing speed α of the flow modulating valve V1 can be expressed by how large of the aperture is increased within a predetermined time according to a pressure of the reservoir tank 2.

For example, in the flow modulating valve V1 comprising a valve body for blocking an opening formed in a valve base and a spindle connected to the valve body, the releasing speed α can be defined as a distance that the spindle moves from a state that the opening is blocked (zero aperture) to a direction that the aperture increases within a predetermined time interval. The moving distance (displacement) of the spindle can be expressed by a percentage with respect to a whole moving distance of the spindle. For example, an exemplary releasing speed α can be a spindle moving distance (%) per 30 seconds.

In addition, according to the present invention, the releasing speed of the flow modulating valve can be replaced with the aperture of the flow modulating valve.

Namely, in the present invention, the "aperture of the flow modulating valve" can be the releasing speed that is a speed of increasing the aperture or can be the aperture itself.

Furthermore, a plurality of reservoir tanks 2 can also be used, which can be applied to a method that the reservoir tanks are sequentially switched from a low pressure reservoir tank to a high pressure reservoir tank.

A fuel filling method using the fuel filling apparatus 10 according to the seventh embodiment of the present invention is described according to FIGS. 9 to 12.

Air temperatures in past time at the area where the fuel filling apparatus 10 are established are input to the temperature history data base 321 for each date and time.

In addition, since the establishment location of the fuel filling apparatus 10 is not restricted, air temperature data at locations where the fuel filling apparatus 10 is assumed to be established can be input to the temperature history data base 321.

According to the fuel filling method, the control unit 323 executes calculation processes shown in following contents (1) to (3) to determine the releasing speed α of the flow modulating valve V1.

(1) Prediction of the Temperature in the Tank Before Filling T1

Air temperatures at time points of filling fuel to the hydrogen automobile 12 are predicted from the past air temperature data previously stored in the temperature history data base 321.

The air temperature prediction can be carried out according to the air temperature at the same past date and time, as well as the weather when filling the fuel, etc.

When the reservoir tank 2 is established near the fuel filling apparatus 10, since the temperature in the reservoir tank 2 will vary according to the air temperature at the vicinity of the fuel filling apparatus 10, the air temperature can be also predicted according to the temperature in the reservoir tank 2. For example, the air temperature during filling the fuel can be considered almost the same as the temperature in the reservoir tank 2. In this case, a thermometer (temperature detection means) can be set in the reservoir tank 2, and the detection signal can be input to the control unit 323 based on a detected value.

In addition, the air temperature during filling the fuel can be directly measured by using a thermometer (air temperature detection means). In this case, the detection signal can be input to the control unit 323 based on a detected value.

Since the temperature T1 in the tank before filling is considered to be affected by the air temperature of the environment where the hydrogen automobile runs, the temperature T1 in the tank before filling can be predicted according to the predicted or measured air temperature. For example, the temperature T1 in the tank before filling can be considered almost the same as the aforementioned air temperature near the fuel filling apparatus 10.

Figure 11:
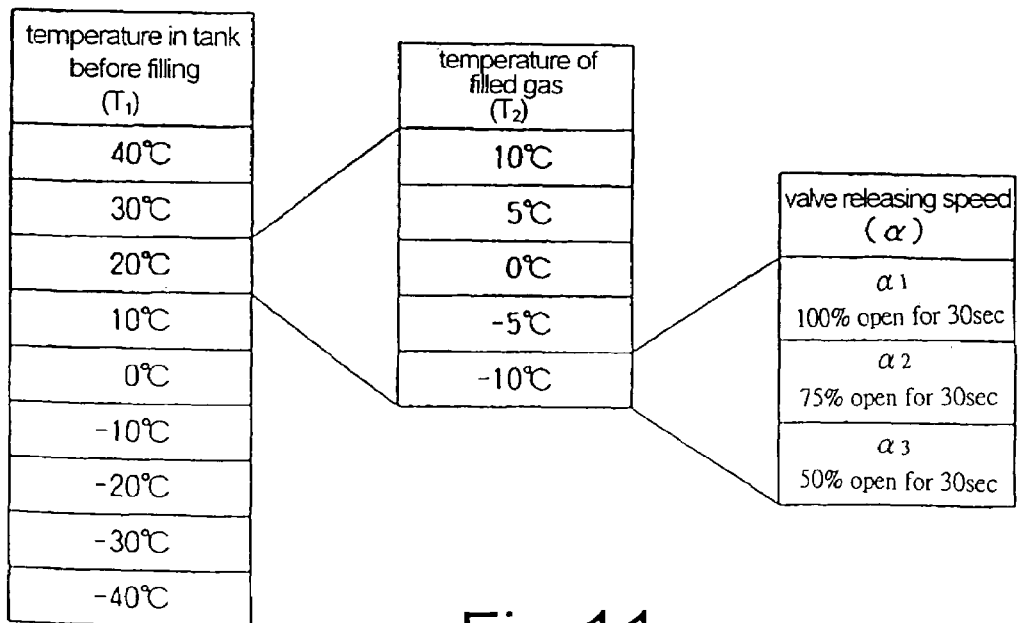
FIG. 11 illustrates an exemplary process according to the fuel filling method of the present invention.

In an example shown in FIG. 11, the temperature T1 in the tank before filling ranges from −40 to 50° C., which is assumptively divided into 9 levels by each 10° C.

In the example, 20° C. among the 9-level assumed temperatures is the predicted temperature of the temperature T1 in the tank before filling.

When the prediction value of the air temperature during filling the fuel is not any one of the 9 level assumed temperatures, a nearest value to prediction value is selected from the above 9-level assumed temperatures (preferably, a value higher than and most near the prediction value ), and this selected value can be set as the temperature T1 in the tank before filling.

In addition, data is complemented according to data related to the assumed temperatures around the prediction value, and then the temperature T1 in the tank before filling can be determined according to complemented data.

(2) Setting of the Temperature of Filled Gas T2

The temperature of the hydrogen gas to be filled into the fuel tank 13 is determined according to settings of the heat exchanger 4, etc.

In an example shown in FIG. 11, the temperature of the fill hydrogen gas is assumed to be 5 levels by each 5° C. ranging from −10 to 10° C. according to the settings of the heat exchanger 4.

In this example, the heat exchanger 4 is fully operated, and among the 5 level temperatures of the temperature T2 of the fill gas, the lowest cooling temperature is set to −10° C.

When the temperature of actually filled hydrogen gas (actual filling temperature) is not any one of the 5 level temperatures, a nearest value to the actual filling value is selected from the above 5-level temperatures (preferably, a value higher than and most near the actual filling temperature), and this selected value can be set as the temperature T2 of the fill gas. In addition, data is complemented according to data related to the assumed temperatures around the actual filling temperature, and then the temperature T2 of the fill gas can be determined according to complemented data.

Furthermore, the temperature T2 of the fill gas can be directly measured by a fill-gas thermometer 18. In this case, the detection signal can be input to the control unit 323 according to the detected value.

(3) Setting of the Releasing Speed a of the Flow Modulating Valve V1

In the example shown in FIG. 11, the releasing speed α is assumed to be the following 3 levels.

α1: 100% open within 30 seconds
α2: 75% open within 30 seconds
α3: 50% open within 30 seconds The releasing speed α is expressed by a distance that the spindle moves from a state that the opening is blocked (zero aperture) to a direction that the aperture increases within a predetermined time interval. The moving distance (displacement) of the spindle can be expressed by a percentage with respect to a whole moving distance of the spindle.

FIG. 12 shows a temporal variation of the temperature in the fuel tank 13 during filling the fuel in a case that the releasing speed is set to any one of α1 to α3 when the temperature T1 in the tank before filling is 20° C. and the temperature of the fill gas is −10° C.

In FIG. 12, since the designed temperature of the fuel tank 13 is set to 85° C., the temperature in the tank has to be lower than 85° C.

Figure 12A:
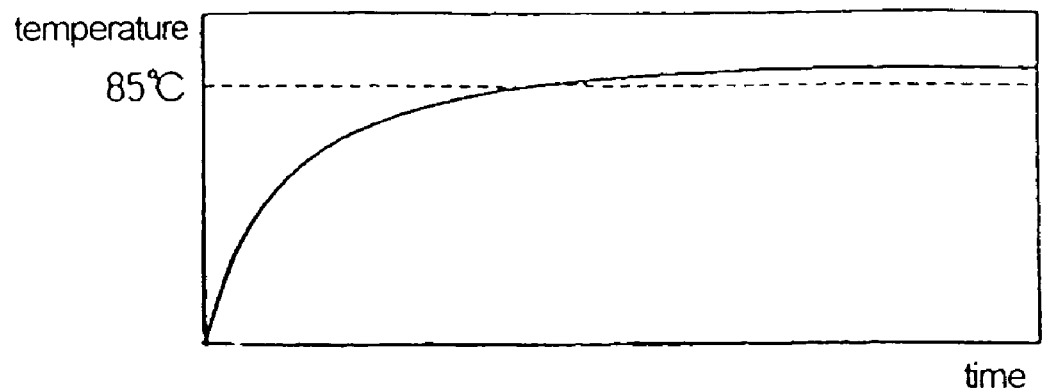
FIG. 12 illustrates an exemplary process according to the fuel filling method of the present invention.

As shown in FIG. 12A, when the releasing speed is set to α1, the temperature in the fuel tank during filling the fuel will exceed the designed temperature 85° C.

Figure 12B:
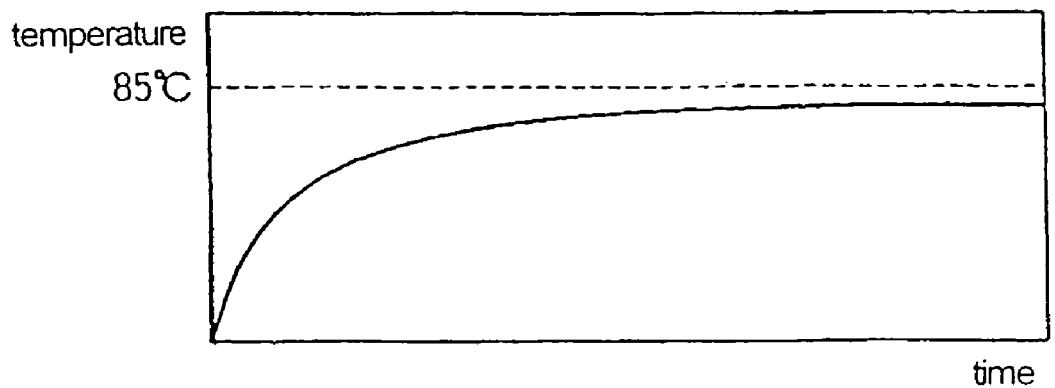
Figure 12C:
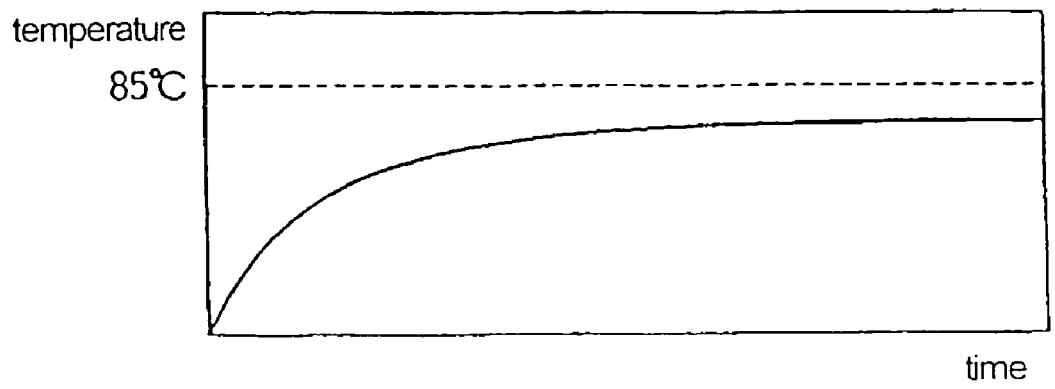

In FIGS. 12B and 12C, when the releasing speed is set to α2 or α3, the temperature in the fuel tank during filling the fuel becomes lower than the designed temperature 85° C.

When the cases of the releasing speed is set to α2 and α3 are compared, the releasing speed α2 is selected because the higher releasing speed can increase the filling speed.

The above processes (1) to (3) are executed at the control unit 323, and as the releasing speed α2 of the flow modulating valve V1 is selected, a control signal corresponding to the releasing speed α2 is transmitted to the flow modulating valve V1. The flow modulating valve V1 increases its aperture with the releasing speed α2 according to the control signal.

Therefore, the hydrogen gas with a flow corresponding to the aperture of the flow modulating valve V1 passes through the supply path 3 and the connection pipe 11 from the reservoir tank 2, and then is filled to the fuel tank 13 of the hydrogen automobile 12.

The temperature in the fuel tank 13 during the filling process, the temperature in the fuel tank 13 is maintained under the designed temperature because the temperature varies with time as shown in FIG. 12B.

In addition, temperature variation data shown in FIGS. 12A to 12C is the case that the pressure in the fuel tank 13 before filling the fuel is zero.

In general, the hydrogen gas amount in the fuel tank 13 of the hydrogen automobile arriving at the fuel filling apparatus 10 is not zero, and the hydrogen gas remains in the fuel tank 13. In this case, as compared with the case that the inner pressure of the fuel tank 13 is zero when the filling operation starts, the temperature rising breath during filling the fuel gas can be suppressed at a low value because the fuel amount that can be filled reduces.

Therefore, the releasing speed α can be set according to the case that the pressure in the fuel tank 13 before filling the fuel is zero (FIGS. 12A to 12C) without problems for safety.

Because the aforementioned fuel filling apparatus 10 comprises the control unit 15 having the memory unit 322 in which the temperature history data base 321 is stored, a large aperture of the flow modulating valve V1 can be selected within a range where the temperature in the fuel tank does not exceed the designed temperature, according to data related to a relationship among the temperature T1 in the tank before filling, the temperature T2 of the fill gas, the releasing speed α of the flow modulating valve V1 and the temperature variation in the tank during filling the fuel gas.

Therefore, the temperature of the fuel tank can be maintained at a low temperature and the filling time can be accordingly shortened.

Furthermore, when the fuel filling amount (the filling pressure with respect to the designed pressure of the fuel tank 13) to the fuel tank 13 is less than 100% (e.g., the filling amount is 50%), the following filling method can be used.

Since the check valve V3 is arranged in the supply path 14 of the hydrogen automobile, the hydrogen gas is supplied when the pressure of the supplying hydrogen gas is larger than the pressure in the fuel tank 13.

Therefore, the hydrogen gas pressure when the hydrogen gas starts filling (the filling start pressure) is substantially the same as the pressure in the fuel tank 13 (the remained gas pressure), and this pressure can be detected by the pressure gauge 19.

The time of filling the hydrogen gas into the fuel tank to an objective amount can be predicted by previously preparing temperature variation data in the fuel tank during the filling operation for each filling start pressure in the temperature history data base 321.

Namely, according to data related to a relationship among the temperatures T1, T2, the releasing speed α, the filling start pressure, and the temperature variation in the tank during filling the fuel gas, a large aperture of the flow modulating valve V1 can be selected within a range that does not exceed the designed temperature in a time until the object of the filling amount is reached.

In this manner, the temperature of the fuel tank 13 can be exactly maintained at a low temperature and the filling operation can become easier.

Figure 13:
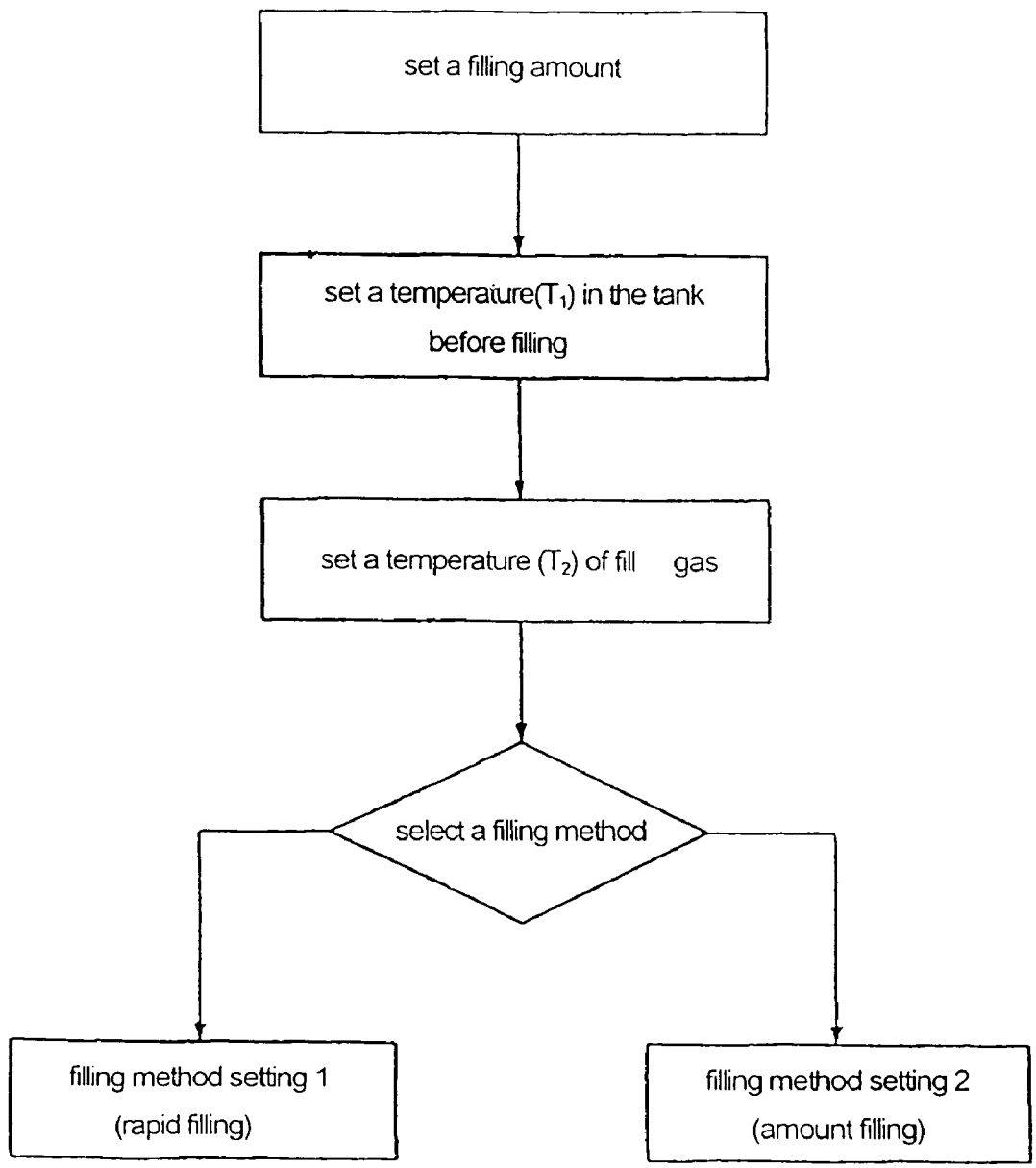
FIG. 13 is a flow chart for explaining another fuel filling method of the present invention.

Another example of fuel filling method according to the invention is described according to FIG. 13.

The method can select any one of a "rapid filling" with an object to extremely shorten the filling time and an "amount filling" with an object to increase the filling amount.

First, the rapid filling method is described.

The rapid filling method is the same as the method of the aforementioned seventh embodiment. The largest aperture of the flow modulating valve V1 is selected within a range where the temperature in the fuel tank does not exceeds the designed temperature of the fuel tank according to data related to a relationship among the temperature T1 in the tank before filling, the temperature T2 of the fill gas, the releasing speed α of the flow modulating valve V1 and the temperature variation in the fuel tank during the filling operation.

For example, as shown in FIG. 13, when the temperature T1 in the tank before filling is 20° C. and the filled gas temperature T2 is −10° C., the largest releasing speed of the flow modulating valve V1 within a range where the temperature in the fuel tank does not exceed the designed temperature of the fuel tank, i.e., the releasing speed α2, can be selected.

In addition, if the cooling ability of the heat exchanger 4 is sufficiently large and the temperature in the tank does not exceed the designed temperature of the fuel tank even though the aperture of the flow modulating valve V1 is set to the largest value, the largest aperture of the flow modulating valve V1 can be always selected.

Next, the amount filling method is described.

First, similar to the rapid filling method, the temperature T1 in the tank before filling and the temperature T2 of the fill gas are determined.

The amount filling method is different from the rapid filling method in that when selecting the releasing speed α of the flow modulating valve V1, a lower releasing speed α, rather than the highest releasing speed α, is selected with the range without exceeding the designed temperature.

For example, as shown in FIG. 13, when the temperature T1 in the tank before filling is 20° C. and the fill gas temperature T2 is −10° C., the smaller releasing speed of the flow modulating valve V1 within a range where the temperature in the fuel tank does not exceed the designed temperature of the fuel tank, i.e., the releasing speed α3, can be selected.

In comparison with the rapid filling method, the amount filling method takes a longer time to fill the fuel gas. However, the temperature in the fuel tank can be suppressed to a low value because the filling speed is low.

Therefore, the filling amount of the hydrogen gas can be increased.

The rapid filling method is preferably used in a situation that the residual hydrogen gas amount in the fuel tank is large and the hydrogen gas amount that should be filled is little. The reason is that in a case that the filling amount is small, the temperature rising breadth in the tank is small even though the filling speed is fast.

The amount filling method is preferably used in a situation that the residual hydrogen gas amount in the fuel tank is small and the hydrogen gas amount that should be filled is large. The reason is that in a case that the filling amount is large, the temperature in the tank rises easily.

Selection of the rapid filling method or the amount filling method can be made by a user (a user of the hydrogen automobile 12), or by an employee (a service person).

In addition, in a rush time with many users, it is preferable to select the rapid filling method to shorten the filling time for each user. In this manner, the user number can be increased.

On the other hand, in an off-peak time with few users, the amount filling method is preferably selected to increase the filling amount for each user.

In addition, when the outdoor air temperature is low, the hydrogen gas can be sufficiently cooled without using the heat exchanger 4. Therefore, whether the heat exchanger 4 can be selected to use or not to use according to the outdoor air temperature, the energy consumption can be suppressed to the minimum with an advantage of reducing cost.

In addition, temperature data corresponding to plural types of the fuel tanks with different capacities can be stored in the temperature history data base, and the aperture of the flow modulating valve V1 is preferably adjusted according to the capacity of the fuel tank that is an object of filling the fuel gas.

Furthermore, in the filling method of the above embodiment, data showing the relationship among the temperature T1 in the tank before filling, the temperature T2 of the fill gas, the releasing speed α of the flow modulating valve V1 and the temperature in the tank during the filling process is acquired to select the releasing speed α accordingly, but the invention is not limited to this manner. For example, the temperature in the tank during the filling process can be calculated according to a formula obtained from above data.

In this case, the releasing speed α is selected according to a calculated temperature in the tank.

Moreover, in the above embodiment, the heat exchanger is set at the secondary side of the flow modulating valve to cool the hydrogen gas, but the same cooling operation can be achieved by providing a cooling function to each constitutive mechanical parts and pipes.

Further, the heat exchanger is set at the secondary side of the flow modulating valve, but the flow modulating valve can be set at the secondary side of the heat exchanger. In this case, the effect of suppressing the temperature from rising is small, but effects of temperature control and flow modulation for the hydrogen gas can be same as the above embodiment.

In the present invention, it is possible not to equip with the flow modulating valve.

As described in the above first and the second embodiments, the fuel filling apparatus of the present invention comprises the overfilling protective valve, and the overfilling protective valve comprises the fuel gas path, the valve unit for opening or closing the fuel gas path by the valve body, the valve body displacement means for displacing the valve body based on the filling pressure of the fuel gas and the temperature modulating unit for modulating the temperature of the valve body displacement means. Therefore, even though a difference between the temperature of the fuel gas and the operation temperature of the overfilling protective valve is large, the temperature of the valve body displacement means can be maintained in a preset temperature range by the temperature modulating unit. As a result, the overfilling protective valve can be exactly operated under the preset pressure. In particular, it is effective for a case that a continuous filling operation is conducted.

In the above fuel filling apparatus, the heat exchanger can be set in the fuel gas supply path for cooling the fuel gas. In this manner, the fuel gas can be cooled almost without increasing the required energy for the temperature modulation of the temperature modulating unit.

In this case, the temperature modulating unit preferably uses the refrigerant supplied to the heat exchanger to be able to cool the valve body displacement means. In this way, supplying the refrigerant to the temperature modulating unit can be easily implemented.

Further, as described in the above third, fourth and fifth embodiments of the present invention, if the fuel filling apparatus with the heat exchanger for cooling the hydrogen gas is used, the hydrogen gas can be cooled and then filled to the fuel tank of the automobile. Therefore, a rapidly rising temperature of the hydrogen gas is suppressed, and the hydrogen gas can be rapid filled.

In addition, a fuel apparatus can be used, in which the heat exchanger for cooling the hydrogen gas by using the liquid inert gas as the refrigerant is equipped. At the heat exchanger, the liquid inert gas is gasified by exchanging heat with the hydrogen gas, and the obtained inert gas can be discharged into the fuel filling apparatus.

In this way, by using the liquid inert gas such as the liquid nitrogen, the hydrogen gas can be cooled and then filled into the fuel tank of the automobile. Therefore, a rapidly rising temperature of the hydrogen gas is suppressed, and the hydrogen gas can be rapid filled.

In addition, by discharging the inert gas gasified by the cooling of the hydrogen gas to the interior of the fuel filling apparatus, the interior of the fuel filling apparatus becomes an inert gas environment and explosion of the hydrogen gas can be prevented. Therefore, to rapidly fill the hydrogen gas can be safely performed and the explosion proof structure of the fuel filling structure can be constructed easily. Accordingly, miniaturization and low cost fuel filling apparatus can be achieved.

Furthermore, the heat exchanger comprises a first heat exchange unit for cooling the hydrogen gas by the intermediate medium and a second heat exchange unit for cooling the intermediate medium by the liquid inert gas. Thereby, the liquid inert gas is supplied to the second heat exchange unit where the intermediate medium is filled, and the intermediate medium is cooled by the liquid inert gas to be controlled at a fixed temperature, so that the hydrogen gas can be cooled by using the intermediate medium. Therefore, the cooling temperature of the hydrogen gas can be exactly controlled.

As described in the sixth and the seventh embodiments of the present invention, since the fuel filling apparatus of the invention has the heat exchanger for cooling the hydrogen gas, low temperature hydrogen fuel gas can be filled to the fuel tank.

Therefore, even though the temperature of the hydrogen gas rises when the hydrogen gas passes through the flow modulating valve, the temperature of the fuel tank can be prevented from over rising.

As a result, the temperature of the fuel tank can be exactly maintained under the preset temperature. Additionally, as compared with the conventional filling method that the temperature of the fuel tank is measured during the filling operation, the temperature management of the fuel tank becomes easier, and therefore, the fuel filling can be performed with a simple operation.

In addition, the control means is equipped with the memory unit for storing the temperature history data base. The control means is constructed by the memory unit in which the temperature history data base is stored, and the control unit where the supply amount of the hydrogen gas is controlled by an aperture modulation of the flow modulating valve according to data stored in the temperature history data base. Thereby, a large aperture of the flow modulating valve can be selected within the range where the temperature in the fuel tank does not exceed the designed temperature according to data stored in the temperature history data base.

Accordingly, the temperature of the fuel tank can be maintained at a low temperature and the filling time can be shortened.

What is claimed is:

1. A fuel filling apparatus for filling a hydrogen gas into a fuel tank of an automobile that uses the hydrogen gas as a fuel, comprising:

a heat exchanger using a liquid inert gas as a refrigerant to cool the hydrogen gas, wherein the heat exchanger performs a heat exchange with the hydrogen gas to gasify the liquid inert gas to obtain an inert gas, and the obtained inert gas is discharged into the fuel filling apparatus, and the liquid inert gas does not mix with the hydrogen gas, and wherein the heat exchanger further comprises a first heat exchange unit for cooling the hydrogen gas by an intermediate medium, and a second heat exchange unit for cooling the intermediate medium by the liquid inert gas.

2. A fuel filling apparatus for filling a hydrogen gas into a fuel tank of an automobile that uses the hydrogen gas as a fuel, comprising:

a flow modulating valve, for modulating a supply amount of hydrogen gas, a cooling means using a liquid inert gas as a refrigerant, for cooling the hydrogen gas passing through the flow modulating valve, wherein the liquid inert gas does not mix with the hydrogen gas, and a control means for controlling the supply amount of the hydrogen gas, wherein the control means further comprises a memory unit for storing a temperature history data base and a control unit for controlling the supply amount of the hydrogen gas by modulating an aperture of the flow modulating valve according to data stored in the temperature history data base, and wherein the temperature history data base comprises data showing a relationship between a temperature in the fuel tank before filling, a temperature of the hydrogen gas fill to the fuel tank, the aperture of the flow modulating valve, and a temperature in the fuel tank when filling the hydrogen gas.

3. A fuel filling method using a fuel filling apparatus to fill a hydrogen gas into a fuel tank of an automobile that uses the hydrogen gas as a fuel, comprising:

cooling the hydrogen gas passing through the flow modulating valve by using a cooling means of the fuel filling apparatus; and filling the cooled hydrogen gas into the fuel tank, wherein the fuel filling apparatus comprises:

a flow modulating valve for modulating a supply amount of the hydrogen gas;

the cooling means using a liquid inert gas as a refrigerant for cooling the hydrogen gas, the liquid inert gas not being mixed with the hydrogen gas; and a control means for controlling the supply amount of the hydrogen gas, wherein the control means for controlling the supply amount of the hydrogen gas comprises a memory unit for storing a temperature history data base and a control unit for controlling the supply amount of the hydrogen gas by modulating an aperture of the flow modulating valve according to data stored in the temperature history data base, and the temperature history data base comprises data showing a relationship between a temperature in the fuel tank before filling, a temperature of the hydrogen gas fill to the fuel tank, the aperture of the flow modulating valve, and a temperature in the fuel tank when filling the hydrogen gas.

* * * * *